(12) United States Patent
Ejofodomi et al.

(10) Patent No.: US 9,715,026 B2
(45) Date of Patent: Jul. 25, 2017

(54) SYSTEM AND METHOD FOR PERFORMING MICROSEISMIC FRACTURE OPERATIONS

(75) Inventors: Efejera Akpodiate Ejofodomi, Buenos Aires (AR); Xiaowei Weng, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 856 days.

(21) Appl. No.: 14/004,612

(22) PCT Filed: Mar. 12, 2012

(86) PCT No.: PCT/US2012/028769
§ 371 (c)(1),
(2), (4) Date: Nov. 25, 2013

(87) PCT Pub. No.: WO2012/125558
PCT Pub. Date: Sep. 20, 2012

(65) Prior Publication Data
US 2014/0076543 A1    Mar. 20, 2014

Related U.S. Application Data

(60) Provisional application No. 61/451,843, filed on Mar. 11, 2011.

(51) Int. Cl.
*G01V 1/28* (2006.01)
*G01V 1/30* (2006.01)

(52) U.S. Cl.
CPC ............. *G01V 1/306* (2013.01); *G01V 1/288* (2013.01); *G01V 2210/1234* (2013.01); *G01V 2210/642* (2013.01); *G01V 2210/646* (2013.01)

(58) Field of Classification Search
CPC .. G01V 1/288; G01V 1/306; G01V 2210/123; G01V 2210/1234; G01V 2210/646
(Continued)

(56) References Cited

U.S. PATENT DOCUMENTS 6,462,549 B1 * 10/2002 Curtis .................... G01V 3/082
181/122
6,947,843 B2    9/2005 Fisher et al.
(Continued)

OTHER PUBLICATIONS

Williams, M. J., Khadhraoui, B. & Bradford, I.; Quantitative Interpretation of Major Planes From Microseismic Event Locations With Application in Production Prediction; SEG 2010 Denver Annual Meeting, Expanded Abstracts; pp. 2085-2089.*
(Continued)

*Primary Examiner* — Ian J Lobo
(74) *Attorney, Agent, or Firm* — Michael L. Flynn

(57) ABSTRACT

A system and method of performing a microseismic fracture operation for a wellsite having a subterranean formation with a complex fracture network therein are provided. The method involves describing a relationship between microseismic events to determine the complex fracture network of the subterranean formation, generating a fault volume by extracting faults from the fracture network based on the relationship between the microseismic events, generating a discrete fracture network comprising discrete fractures from the complex fracture network by extracting fracture planes from the obtained fault volume, and simulating fracture geometry and proppant placement.

31 Claims, 20 Drawing Sheets

(58) Field of Classification Search
USPC .............................................. 367/25; 702/11
See application file for complete search history.

(56) References Cited

U.S. PATENT DOCUMENTS

| | | | |
|---|---|---|---|
| 7,663,970 | B2 | 2/2010 | Duncan et al. |
| 8,498,852 | B2* | 7/2013 | Xu .......................... E21B 43/26 703/10 |
| 2009/0093965 | A1 | 4/2009 | Godfrey et al. |
| 2010/0256964 | A1 | 10/2010 | Lee et al. |
| 2010/0262372 | A1 | 10/2010 | Le Calvez et al. |

OTHER PUBLICATIONS

Bratton, et al., "Rock Strength Parameters From Annular Pressure While Drilling and Dipole Sonic Dispersion Analysis", SPWLA 45th Annual Logging Symposium, Noordwijk, Netherlands, Jun. 6-9, 2004, 14 pages.

Cipolla, et al., "Effect of Well Placement on Production and Frac Design in a Mature Tight Gas Field", SPE 95337—SPE Annual Technical Conference and Exhibition, Dallas, Texas, Oct. 9-12, 2005, pp. 1-10.

Cipolla, et al., "Integrating Microseismic Mapping and Complex Fracture Modeling to Characterize Hydraulic Fracture Complexity", SPE 140185—SPE Hydraulic Technology Conference, The Woodlands, Texas, 2011, pp. 1-22.

Cipolla, et al., "The Relationship Between Fracture Complexity, Reservoir Properties, and Fracture-Treatment Design", SPE 115769—SPE Annual technical Conference and Exhibition, Denver, Colorado, Sep. 21-24, 2008, pp. 1-24.

Cipolla, C. L. et al., "Hydraulic Fracture Complexity: Diagnosis, Remediation, and Exploration", SPE 115771—SPE Asia Pacific Oil and Gas Conference, Perth Australia, Oct. 20-22, 2008, pp. 1-24.

Du, et al., "A Workflow for Integrated Barnett Shale Gas Reservoir Modeling and Simulation", SPE 122934—Latin American and Caribbean Petroleum Engineering Conference, Cartagena de Indias, Colombia, 2009, pp. 1-12.

Fisher, et al., "Integrating Fracture Mapping Technologies to Optimize Stimulations in the Barnett Shale", SPE 77441—SPE Annual Technical Conference and Exhibition, 2002, pp. 1-7.

Fomin, et al., "Advances in mathematical modeling of hydraulic stimulation of a subterranean fractured reservoir", Proceedings SPIE 5831: Eighth International Workshop on Nondestructive Testing and Computer Simulations in Science and Engineering, Apr. 29, 2005, pp. 148-154.

Le Calvez, et al., "Using Induced Microseismicity to Monitor Hydraulic Fracture Treatment: A Tool to Improve Completion Techniques and Reservoir Management", SPE 104570—SPE Eastern Regional Meeting, Canton, OH, Oct. 11-13, 2006, pp. 1-9.

Maxwell, S. C. et al., "Microseismic Imaging of Hydraulic Fracture Complexity in the Barnett Shale", SPE 77440—SPE Annual Technical Conference and Exhibition, San Antonio, Texas, 2002, pp. 1-9.

Mayerhofer, et al., "Integration of microseismic fracture mapping results with numerical fracture network production modeling in the Barnett shale", SPE 102103—SPE Annual Technical Conference and Exhibition, San Antonio, Texas, Sep. 24-27, 2006, pp. 1-8.

Mayerhofer, et al., "What is Stimulated Reservoir Volume (SRV)?", SPE 119890, SPE Shale Gas Production Conference, Fort Worth, TX, Nov. 16-18, 2008, pp. 1-14.

Napier, et al., "Comparison of Numerical and Physical Models for Understanding Shear Fracture Processes", Pure and Applied Geophysics, vol. 163, 2006, pp. 1153-1174.

Olson, et al., "Modeling simultaneous growth of multiple hydraulic fractures and their interaction with natural fractures", SPE 119739—SPE Hydraulic Fracturing Technology Conference, The Woodlands, Texas, Jan. 19-21, 2009, pp. 1-7.

Qiu, et al., "Applying Curvature and Fracture Analysis to the Placement of Horizontal Wells: Example from the Mabee (San Andres) Reservoir, Texas", SPE 70010—SPE Permian Basin Oil and gas Recovery Conference, Midland, Texas, May 15-17, 2001, pp. 1-9.

Sahimi, et al., "New Models for Natural and Hydraulic Fracturing of Heterogeneous Rock", SPE 29648—SPE Western Regional Meeting, Bakersfield, California, Mar. 8-10, 1995, pp. 1-16.

Tezuka, et al., "Fractured Reservoir Characterization Incorporating Microseismic Monitoring and Pressure Analysis During Massive Hydraulic Injection", IPTC 12391—International Petroleum Technology Conference, Kuala, Lumpur, Dec. 3-5, 2008, pp. 1-7.

Warpinski, et al., "Mapping Hydraulic Fracture Growth and Geometry Using Microseismic Events Detected by a Wireline Retrievable Accelerometer Array", SPE 40014—SPE Gas Technology Symposium, Calgary, Alberta, Canada, Mar. 15-18, 1998, pp. 1-12.

Warpinski, et al., "Simulating Unconventional Reservoirs: Maximizing Networkgrowth while Optimizing Fracture Conductivity", SPE 114173—SPE Unconventional Reservoirs Conference, Keystone, CO, Feb. 10-12, 2008, pp. 1-19.

Warpinski, N. R., "Integrating Microseismic Monitoring with Well Completions, Reservoir Behavior and Rock Mechanics", SPE 125239—Tight Gas Completions Conference, San Antonio, TX, Jun. 15-17, 2009, pp. 1-13.

Weng, et al., "Modeling of Hydraulic-Fracture-Network Propagation in a Naturally Fractured Formation", SPE 140253—SPE Hydraulic Fracturing Technology Conference, The Woodlands, Texas, Jan. 24-26, 2011, 18 pages.

Wenyue, et al., "Characterization of Hydraulically-Induced Shale Fracture Network Using an Analytical/Semi-Analytical Model", SPE 124697—SPE Annual Technical Conference and Exhibition, New Orleans, Louisiana, Oct. 4-7, 2009, pp. 1-7.

Will, et al., "Integration of Seismic Anisotropy and Reservoir Performance Data for Characterization of Naturally Fractured Reservoirs Using Discrete Feature Network Models", SPE 84412—SPE Annual Technical Conference and Exhibition, Denver, Colorado, Oct. 5-8, 2003, pp. 1-12.

Xu, et al., "Characterization of a Hydraulically-Induced Shale Fracture Network Using a Analystical/Semi-Analytical Model", SPE 124697—SPE Annual Technical Conference and Exhibition, New Orleans, Louisiana, Oct. 4-7, 2009, 7 pages.

International Search Report issued in PCT/US2012/028769 on Nov. 1, 2012, 3 pages.

\* cited by examiner

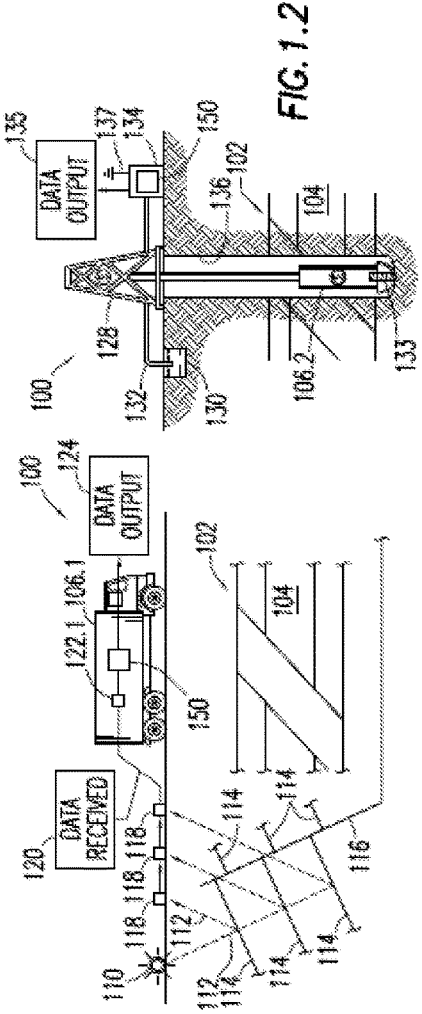
FIG. 1.1
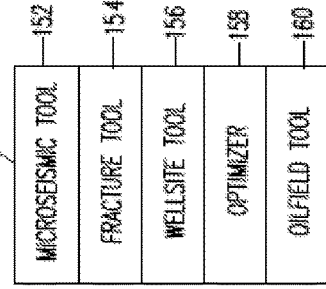
FIG. 1.5
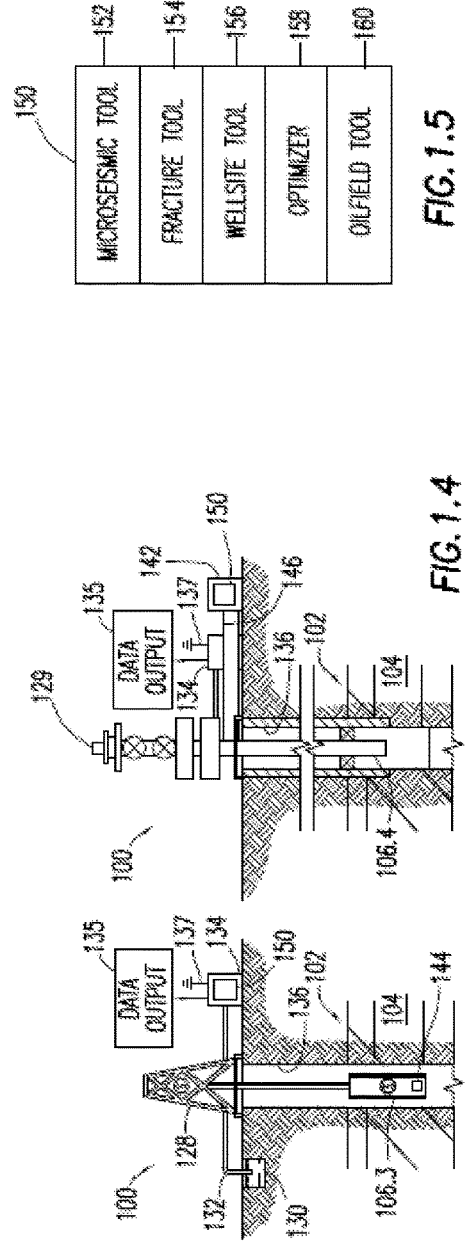
FIG. 1.2
FIG. 1.3
FIG. 1.4

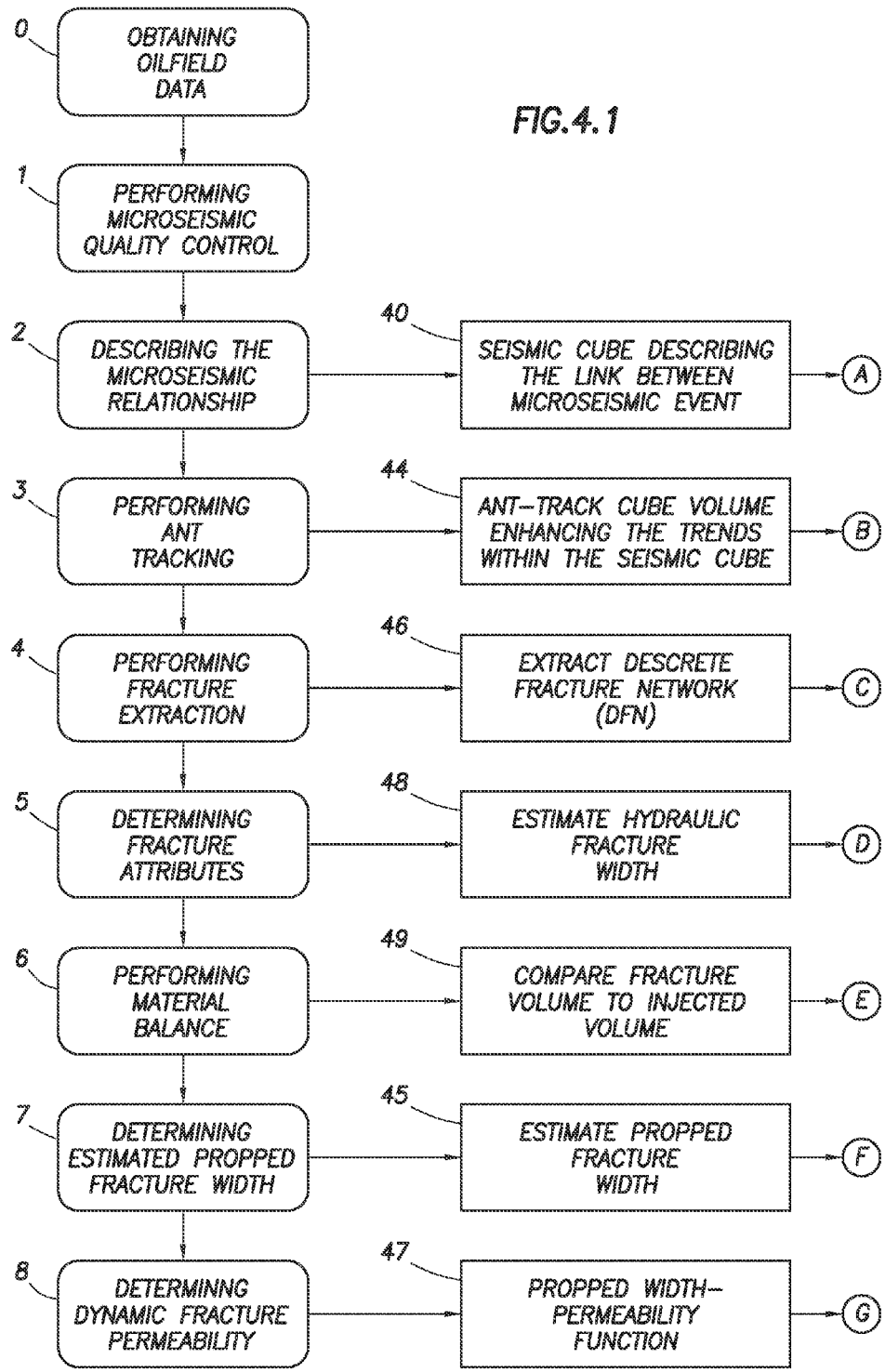
FIG.4.1

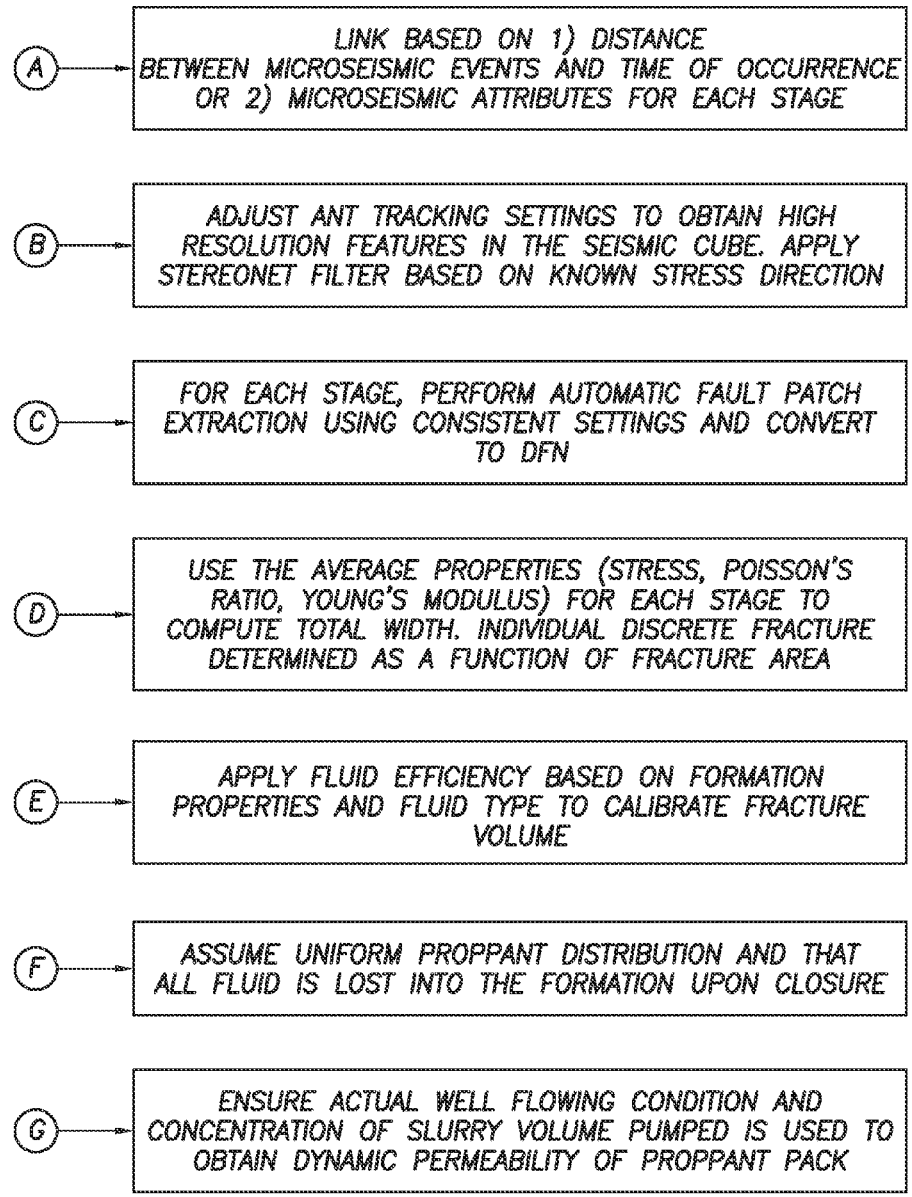
FIG.4.2

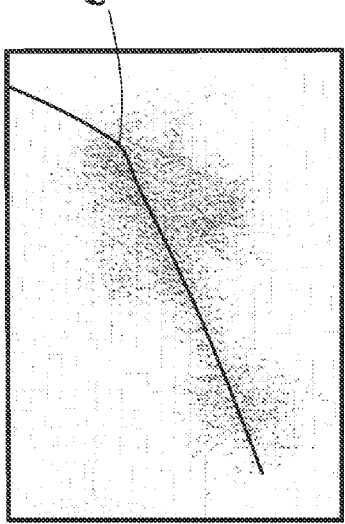
FIG. 7.1
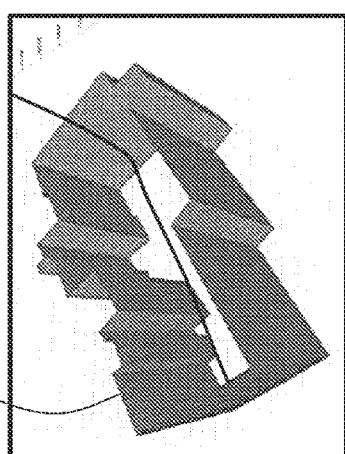
FIG. 7.2
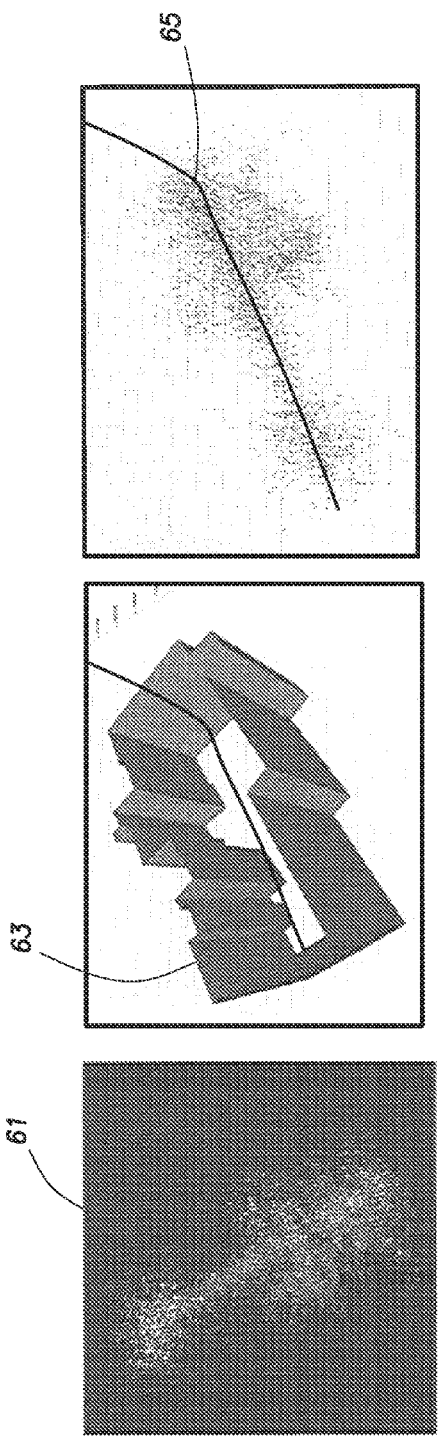
FIG. 7.3
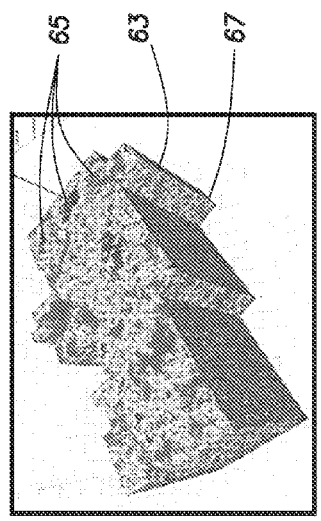
FIG. 7.4
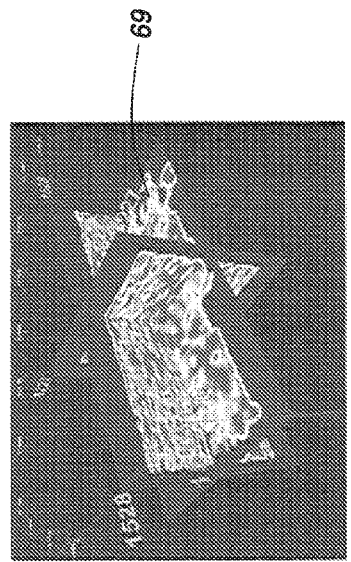
FIG. 7.5

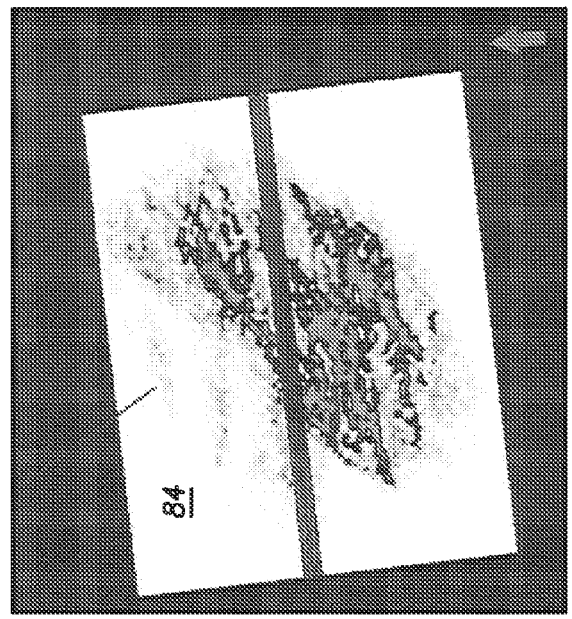
FIG.8.2
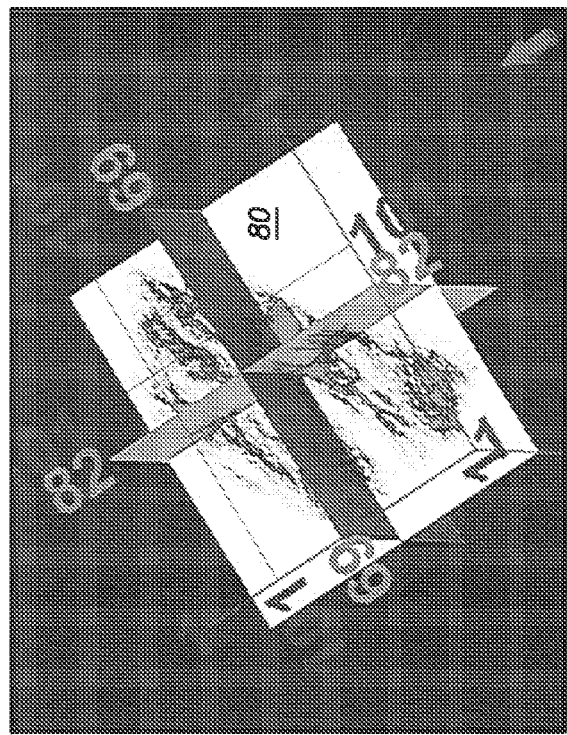
FIG.8.1

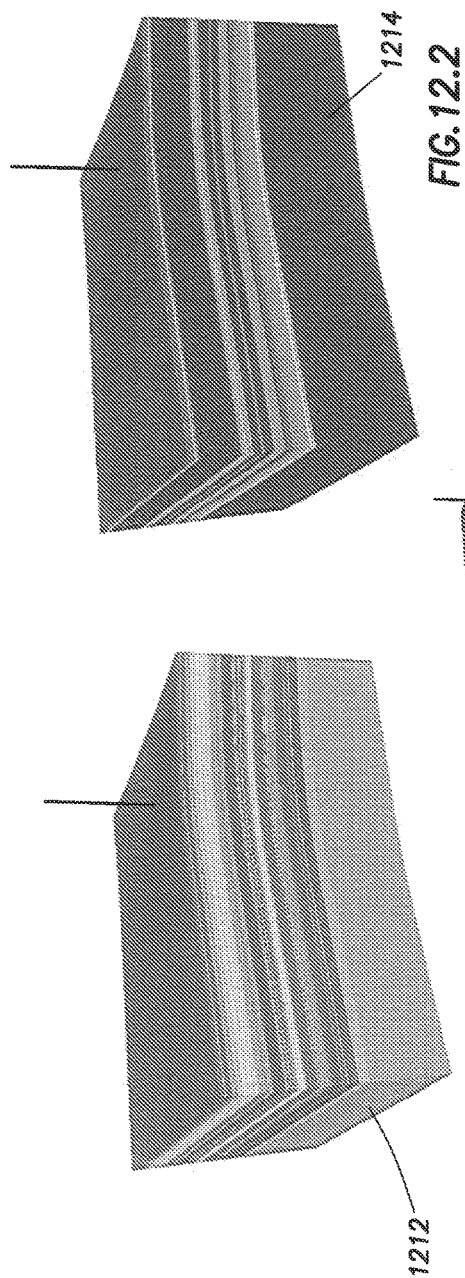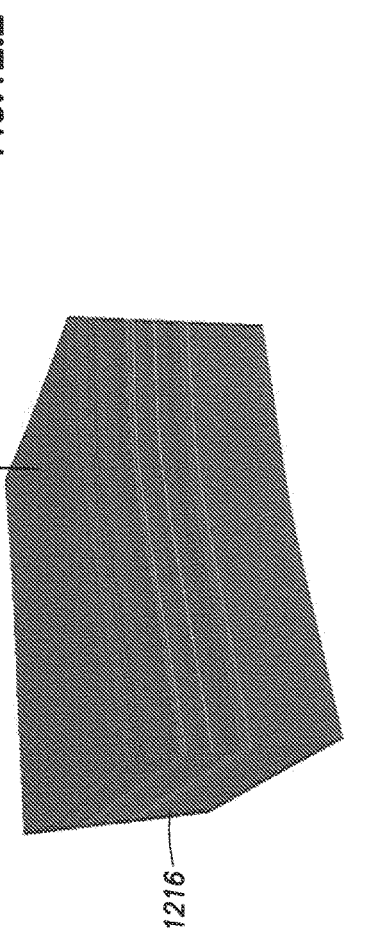

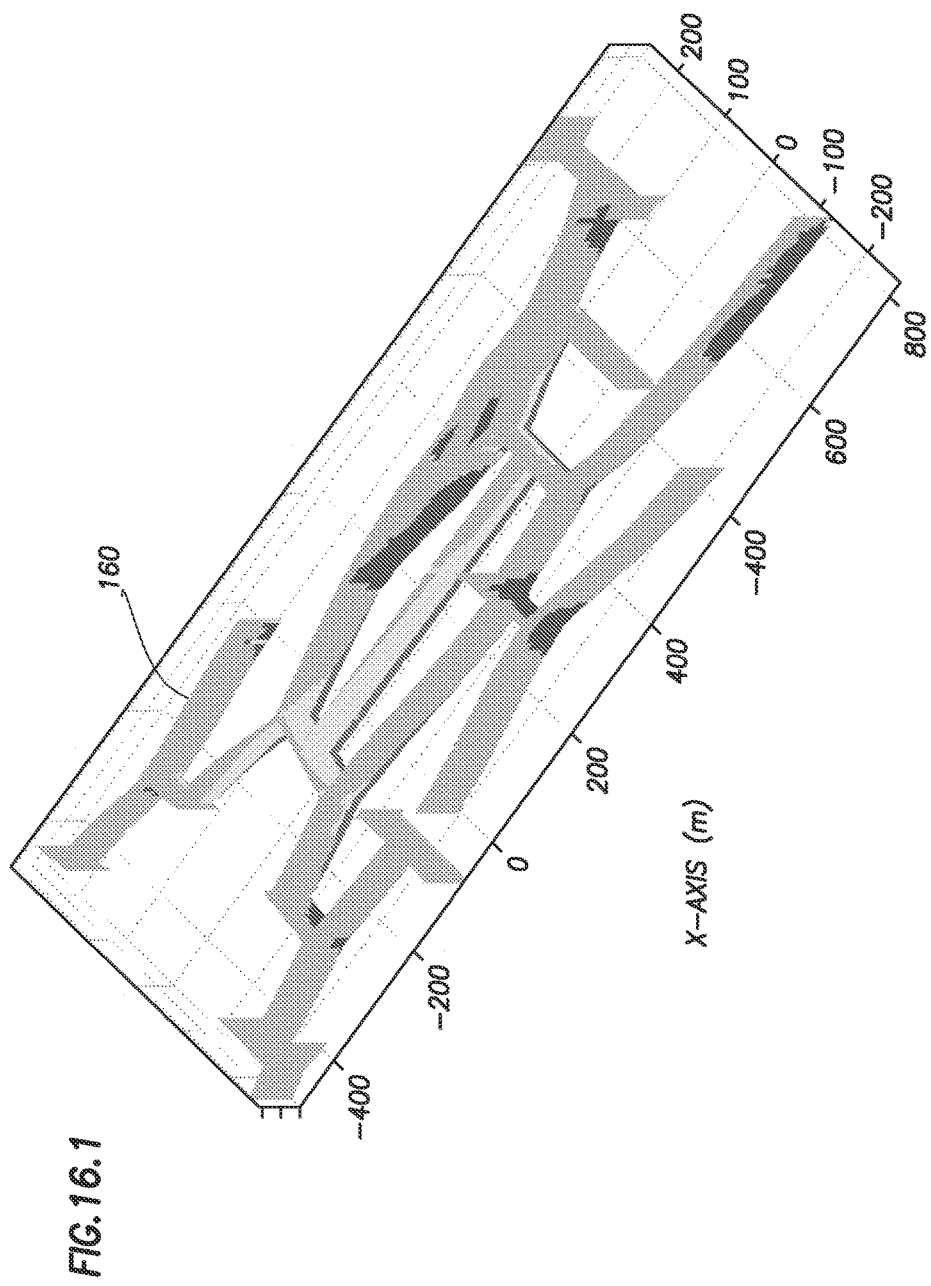
FIG.16.1

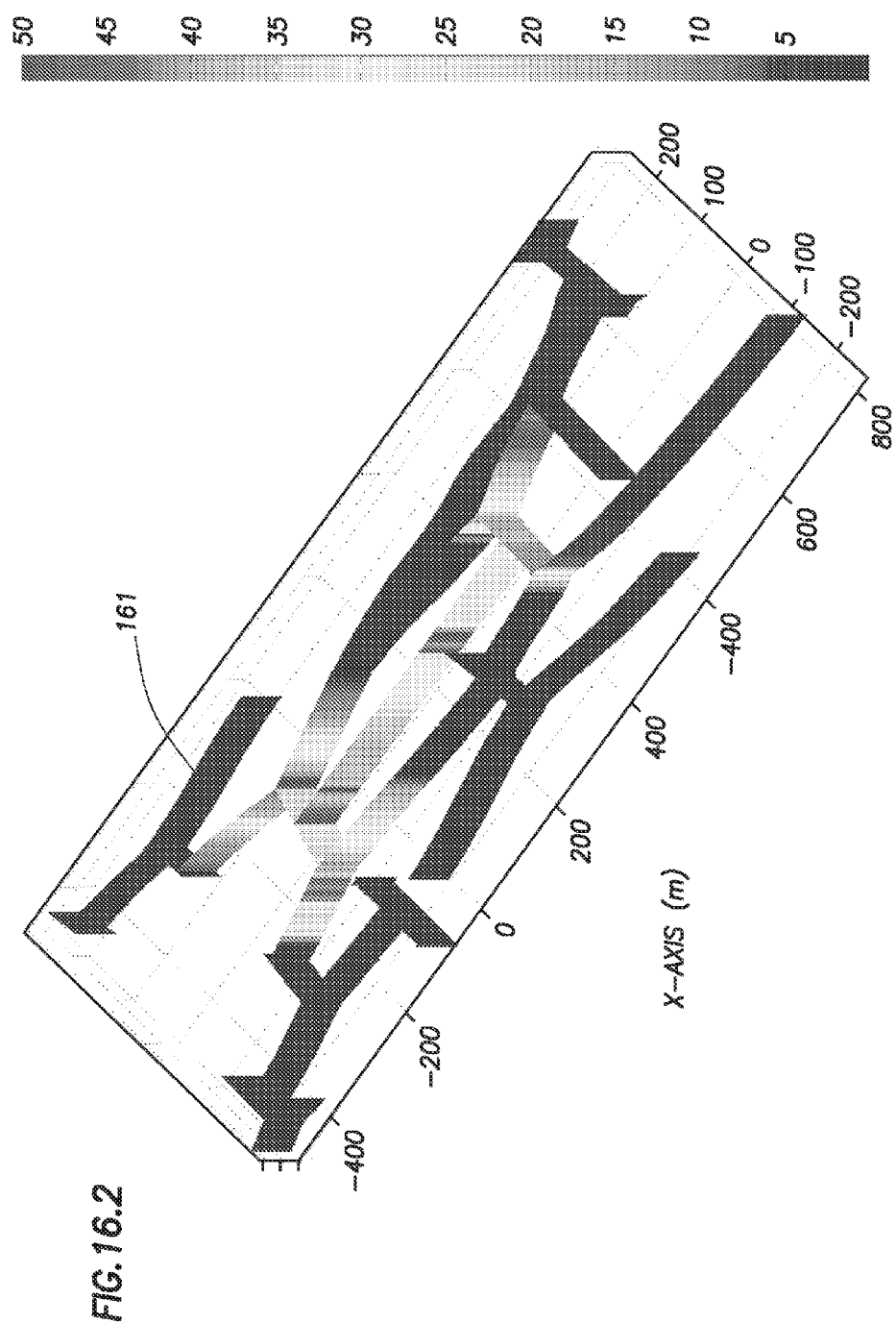
FIG.16.2

SYSTEM AND METHOD FOR PERFORMING MICROSEISMIC FRACTURE OPERATIONS

BACKGROUND

Understanding the nature and degree of hydraulic fracture complexity may be useful to the economic development of unconventional resources. Examples of hydraulic fracture techniques are described in the following papers: Mayerhofer et al., Integrating of Microseismic Fracture Mapping Results with Numerical Fracture Network Production Modeling in the Barnett Shale, Society of Petroleum Engineers (SPE) 102103, presented at the SPE Annual Technical Conference and Exhibition, San Antonio, Tex., 24-24 Sep. 2006; Mayerhofer et al., What is Stimulated Reservoir Volume (SRV)?, SPE 119890 presented at the SPE Shale Gas Production Conference, Fort Worth, Tex., 16-18 Nov. 2008; Warpinski et al., Stimulating Unconventional Reservoirs: Maximizing Network Growth while Optimizing Fracture Conductivity, SPE 114173 presented at the SPE Unconventional Reservoirs Conference, Keystone, Colo., 10-12 Feb. 2008; and Cipolla et al., The Relationship between Fracture Complexity, Reservoir Properties, and Fracture Treatment Design, SPE 115769 presented at the SPE Annual Technical Conference and Exhibition, Denver, Colo., 21-24 Sep. 2008.

Complex hydraulic fracture propagation may be interpreted from microseismic measurements, for example, from unconventional reservoirs and tight gas reservoirs. Examples of complex hydraulic fracture techniques are provided in the following articles Maxwell et al., Microseismic Imaging of Hydraulic Fracture Complexity in the Barnett Shale, SPE 77440 presented at the SPE Annual Technical Conference and Exhibition, San Antonio, Tex., Sep. 29-Oct. 2, 2002; Fisher et al., Integrating Fracture Mapping Technologies to Optimize Stimulations in the Barnett Shale, 77411 presented at the SPE Annual Technical Conference and Exhibition, San Antonio, Tex., Sep. 29-Oct. 2, 2002; Cipolla et al., Effect of Well Placement on Production and Frac Design in a Mature Tight Gas Field, 95337 presented at the SPE Annual Technical Conference and Exhibition, Dallas, Tex., 9-12 Oct. 2005; and Warpinski et al., Stimulating Unconventional Reservoirs: Maximizing Network Growth while Optimizing Fracture Conductivity, SPE 114173 presented at the SPE Unconventional Reservoirs Conference, Keystone, Colo., 10-12 Feb. 2008.

In some cases, challenges may exist in distinguishing between small scale fracture complexity and simple planar fracture growth. A factor that may influence the creation of complex fracture systems is the presence and distribution of natural fractures. An example of complex fractures is shown in Cipolla et al., Integrating Microseismic Mapping and Complex Fracture Modeling to Characterize Fracture Complexity, SPE 140185 presented at the SPE Hydraulic Fracturing Technology Conference, The Woodlands, Tex., 24-26 Feb. 2011. Discrete Fracture Network (DFN) models have been used to simulate production in naturally fractured reservoirs as shown, for example, in the following papers: Dershowitz et al., A Workflow for Integrated Barnett Shale Reservoir Modeling and Simulation, SPE 122934 presented at the SPE Latin American and Caribbean Petroleum Engineering Conference, Cartagena, Columbia, 31 May-3 Jun. 2009; Qui et al., Applying Curvature and Fracture Analysis to the Placement of Horizontal Wells: Example from the Mabee (San Adres) Reservoir, Tex., SPE 70010 presented at the SPE Permian Basin Oil and Gas Recovery Conference, Midland, Tex. 15-17 May 2001; and Will et al., Integration of Seismic Anisotropy and Reservoir-Performance Data for Characterization of Naturally Fractured Reservoirs Using Discrete-Feature-Network Models, SPE 84412 presented at the SPE Annual Technical Conference and Exhibition, Denver, Colo., 5-8 Oct. 2003. These methods, along with log-based approaches (see, e.g., Bratton et al., Rock Strength Parameters from Annular Pressure While Drilling and Dipole Sonic Dispersion Analysis, Presented at the SPWLA 45th Annual Logging Symposium, Noordwijk, The Netherlands, 6-9 Jun. 2004) may be primarily descriptive. Some such methods may be used to characterize a structure of the natural fracture network by using seismic information to extend observations at the wellbore across the reservoir.

Some models have also been developed to quantify the propagation of complex hydraulic fracture networks in, for example, formations embedded with predefined, deterministic or stochastic natural fractures. Examples of complex fracture models are described in the following: Sahimi, M., New Models For Natural And Hydraulic Fracturing On Heterogeneous Rock, SPE 29648 presented at the SPE Western Regional Meeting, Bakersfield, Calif. (1995); Fomin et al., Advances In Mathematical Modeling Of Hydraulic Stimulation Of A Subterranean Fractured Reservoir, Proc. SPIE 5831: 148-154 (2005); Napier et al., Comparison Of Numerical And Physical Models For Understanding Shear Fracture Process, Pure Appl. Geophys, 163: 1153-1174 (2006); Tezuka et al., Fractured Reservoir Characterization Incorporating Microseismic Monitoring And Pressure Analysis During Massive Hydraulic Injection, IPTC 12391 presented at the International Petroleum Technology Conference, Kuala Lumpur, Malaysia (2008); Olsen et al., Modeling Simultaneous Growth Of Multiple Hydraulic Fractures And Their Interaction With Natural Fractures, SPE 119739 presented at the Hydraulic Fracturing Technology Conference, The Woodlands, Tex. (2009); and Xu et al., Characterization of Hydraulically Induced Shale Fracture Network Using an Analytical/Semi-Analytical Model, SPE 124697 presented at the SPE Annual Technical Conference and Exhibition, New Orleans, 4-7 Oct. 2009; and Weng et al., Modeling of Hydraulic Fracture Propagation in a Naturally Fractured Formation, SPE 140253 presented at the SPE Hydraulic Fracturing Technology Conference, Woodlands, Tex., USA, 24-26 Jan. 2011. In some models, microseismic activity may be used to constrain the fracturing process.

Despite the advancements in fracture technology, it may be useful to have advanced techniques for extracting and/or assessing the complex fracture network.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In at least one aspect, the disclosure relates to a method of performing a microseismic fracture operation for a wellsite having a subterranean formation with a complex fracture network therein. The method involves describing a relationship between microseismic events of the complex fracture network of the subterranean formation, generating a fault volume by extracting faults from the fracture network based on the relationship between the microseismic events, generating a discrete fracture network comprising discrete fractures from the complex fracture network by extracting fracture planes from the obtained fault volume, and simulating fracture geometry and proppant placement.

In another aspect, the disclosure relates to a method of performing a microseismic fracture operation for a wellsite having a subterranean formation with a fracture network therein involving describing a relationship between microseismic events of the complex fracture network of the subterranean formation, generating a fault volume by extracting faults from the fracture network based on the relationship between the microseismic events, generating a discrete fracture network comprising discrete fractures from the complex fracture network by extracting fracture planes from the obtained fault volume, determining fracture attributes of the discrete fractures of the fracture planes, determining permeability from a correlation between dynamic wellsite parameters and the fracture attributes, and determining an estimated production rate based on the adjusted fracture parameters.

Finally, in another aspect, the disclosure relates to a system for performing a microseismic fracture operation for a wellsite having a subterranean formation with a fracture network therein. The system includes a fracture unit including a microseismic tool, a fracture tool, a wellsite tool and an optimizer. The microseismic tool generates fault volumes by describing a relationship between microseismic events of the fracture network and extracting faults in the fracture network based on the relationship between the microseismic events. The fracture tool generates discrete fractures from the fracture network by extracting fracture planes from the obtained fault volumes and determines fracture attributes of the discrete fractures of the fracture planes. The wellsite tool simulates fracture geometry and proppant placement. The optimizer adjusts the fracture attributes based on dynamic modeling.

Embodiments of the present disclosure may include one or more method, computing device, computer-readable medium, and system for microseismic fracture network (MFN) modeling.

BRIEF DESCRIPTION OF THE DRAWINGS

Embodiments of microseismic fracture techniques are described with reference to the following figures. The same numbers are used throughout the figures to reference like features and components. Implementations of various technologies will hereafter be described with reference to the accompanying drawings. It should be understood, however, that the accompanying drawings illustrate only the various implementations described herein and are not meant to limit the scope of various technologies described herein.

FIGS. 1.1-1.5 illustrate simplified, schematic views of an oilfield having subterranean formations containing reservoirs therein in accordance with implementations of various technologies and techniques described herein.

FIGS. 4.1-4.2 illustrate flow charts of a method in accordance with implementations of various technologies and techniques described herein.

FIGS. 7.1-7.5 illustrate screenshot results in accordance with implementations of various technologies and techniques described herein.

FIGS. 8.1-8.2 illustrate screenshot results in accordance with implementations of various technologies and techniques described herein.

FIGS. 12.1-12.3 illustrate 3D models in accordance with implementations of various technologies and techniques described herein.

FIGS. 16.1 and 16.2 illustrate simulations using an unconventional fracture model.

DETAILED DESCRIPTION

Figure 2:
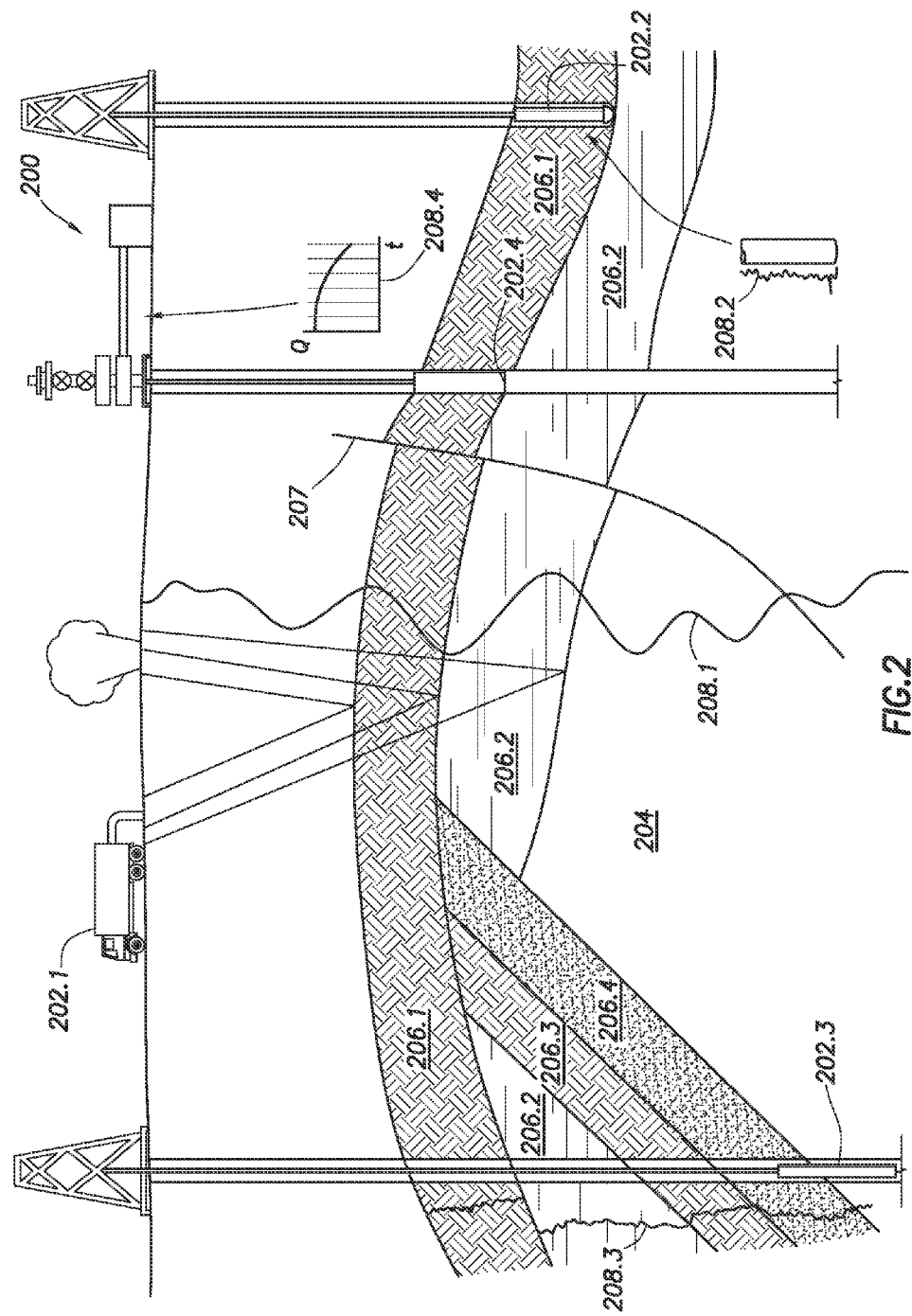
FIG. 2 illustrates a schematic view, partially in cross section, of an oilfield having a plurality of data acquisition tools positioned at various locations along the oilfield for collecting data from the subterranean formations in accordance with implementations of various technologies and techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The disclosure relates to techniques for performing microseismic fracture operations, such as extracting or assessing the complex fracture network from microseismic activity. The techniques may be used, for example, to extract and estimate the attributes or properties of an induced complex fracture network from microseismic activity created during stimulation treatments in unconventional reservoirs. The techniques may not be restricted to a particular formation, well type, and/or type of array used to acquire the microseismic signal.

Introduction

FIGS. 1.1-1.4 illustrate simplified, schematic views of oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction. The surface unit 134 is also depicted as having a microseismic fracture operation system 150 as will be described further herein.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown) near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may to deviate from the drilling plan. Additionally, as drilling or other operations are performed, the subsurface conditions may change. The earth model may also provide adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems. The surface unit 134 is also depicted as having a microseismic fracture operation system 150 as will be described further herein.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a surveyor other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 1.5 depicts the microseismic fracture operation system 150. As shown, the microseismic fracture operation system 150 includes a microseismic tool 152, a fracture tool 154, a wellsite tool 156, an optimizer 158 and an oilfield tool 160. The microseismic tool 152 may be used to perform Ant-tracking. The fracture tool 154 may be used to perform fracture extraction. The wellsite tool 156 may be used to generate fracture attributes, such as permeabilities. The optimizer 158 may be used to perform dynamic modeling and adjust the fracture attributes based on the dynamic modeling. The oilfield tool 160 may be used to obtain wellsite data from, for example, the sensors S from FIGS. 1.1-1.4 and manipulate the data as needed for use by the other tools of the microseismic fracture operation system 150. Each of these functions is described further herein.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that may provide a resistivity or other measurement of the formation at various depths.

A production decline curve or graph 208.4 is a dynamic data plot of the fluid flow rate over time. The production decline curve may provide the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, for example below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 is used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3:
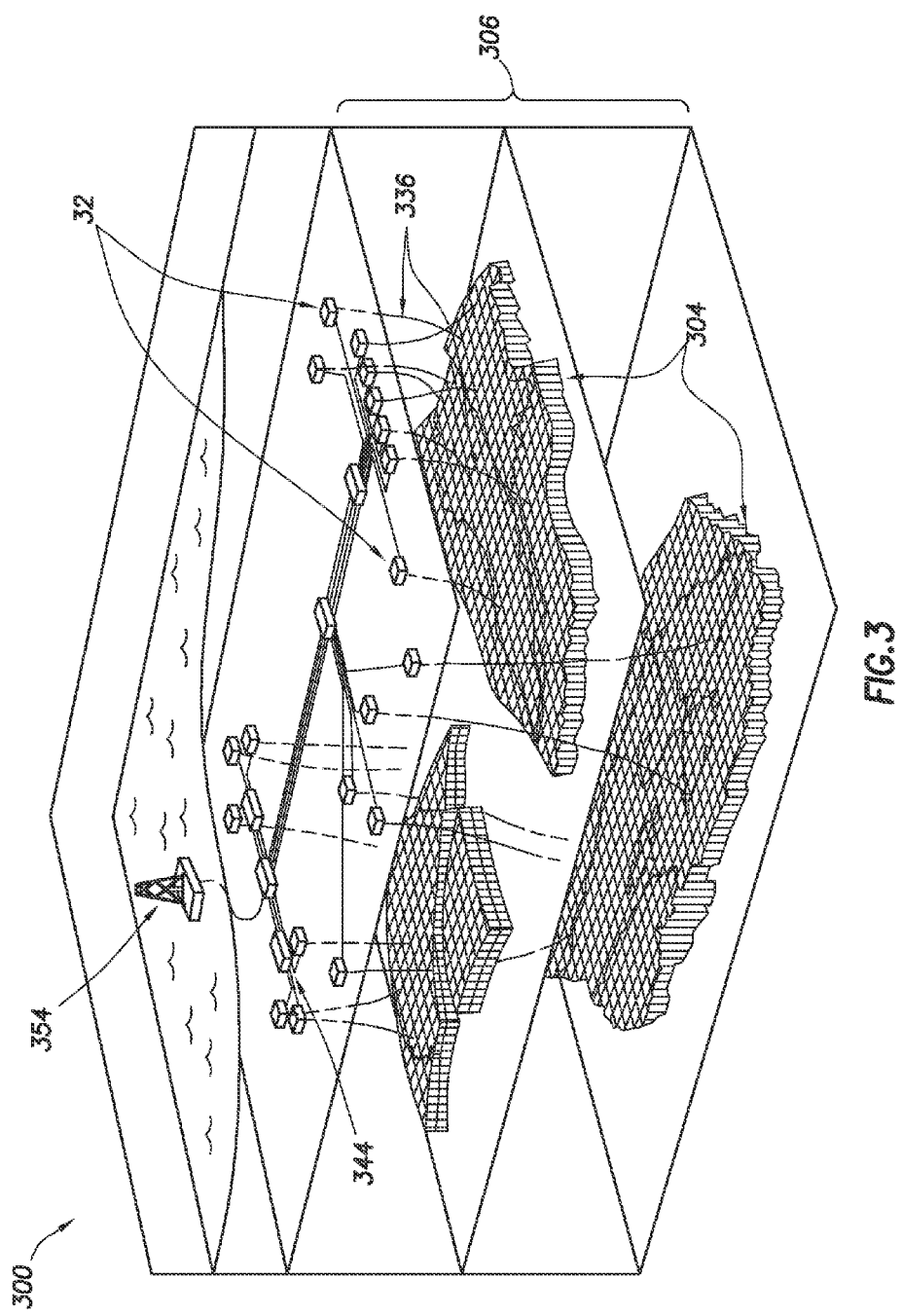
FIG. 3 illustrates a production system for performing one or more oilfield operations in accordance with implementations of various technologies and techniques described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Introduction—Part 1

The present disclosure describes a methodology for performing a microseismic fracture operation. This operation may involve generating various wellsite parameters, such as fracture attributes (e.g., fracture width, porosity, permeability and factors used in fracture simulations) and production properties (e.g., production rate). This operation may also be used to predict fracture geometry by providing a basic description of natural fractures. The methodology may involve a methodology to model the induced complex hydraulic fracture network created during stimulation treatments involving microseismic mapping. Planes describing the complex fracture network may be extracted from the existing microseismic events and calibrated to geomechanical properties and the stimulation treatment parameters to obtain fracture attributes (i.e., width, porosity, and permeability) for performing a dual porosity numerical reservoir simulation, or single porosity simulation with direct modeling of the extracted complex fracture network.

Unlike bi-wing hydraulic fractures created in conventional reservoirs, fracture networks created in shale-gas reservoirs may be complex in nature. These complex fractures may have an impact on the well performance, and the nature and degree of the fracture complexity may be understood to select the optimum stimulation design and completion strategy. Microseismic mapping has been used in the development of shale-gas reservoirs, and has confirmed the existence of complex fracture growth. Explicitly defining the nature of the created fracture network from the microseismic events may prove to be challenging due to several different reasons.

Wellsite modeling software capable of performing, for example, reservoir, geological and geophysical modeling may be used in performing the modeling. The software may be, for example, PETREL™ software, a technology commercially available from SCHLUMBERGER™, Ltd. of Houston, Tex. (referred to herein as "PETREL™"). For simplicity and by way of example, the methods described herein will be described with respect to PETREL™, but may be used with any modeling software.

Wellsite modeling software, such as PETREL™, may provide "Ant-tracking", a technology that performs edge enhancement for the identification of faults, fractures, and other linear anomalies within a seismic volume. Ant-tracking may involve, for example, edge enhancement for the identification of faults, fractures, and other linear anomalies within a seismic volume. Ant-tracking may be used to emulate the behavior of ant colonies in nature and how they use foramens to mark their paths to optimize the search for food. When applied on a given set of microseismic events for an individual stimulation stage, it may reveal a connection between each microseismic event or ultimately, the complex fracture network system for that particular stage. To achieve this, the microseismic events may be converted into a suitable format similar to a seismic cube. A method describing the microseismic volume as a function of time and distance may be used as an input to the Ant-tracking process. Examples of Ant-tracking are provided in US Patent Application No. 2010/0256964, the entire contents of which are hereby incorporated herein.

An alternative method utilizing several fracture attributes of the microseismic events (i.e., magnitude, moment, and compressional-to-shear wave amplitude ratio) may also be used as the input to the Ant-tracking process. This involves converting the microseismic events to data points (e.g., PETREL™ points), up-scaling each of the fracture attributes defined above into a 3D geo-model space, interpolating or distributing the fracture attributes in the entire 3D grid, and converting it into a seismic cube used as the input for the Ant-tracking process.

3D fault patches or planes of discontinuity may then be extracted from the Ant-tracking volume, analyzed, and converted to a deterministic discrete fracture network (DFN) which describes the complex fracture network created during the stimulation treatment. To calibrate the extracted DFN, a user may estimate the width and permeability for each fracture within the fracture network, constrained by the total amount of injected fluid and proppant, wellbore pressure, and the geomechanical properties of the formation (i.e., stress, Young's modulus, Poisson's ratio).

Embodiments of the present disclosure may have applicability in predicting the fracture geometry with complex hydraulic fracture simulators by providing a basic description of the pre-existing natural fractures in the formation that may be used by the simulators.

Additionally, embodiments of the present disclosure may also be used to derive the various fracture attributes (or parameters), such as porosity, permeability, and matrix-fracture coupling factor used for dual-porosity, numerical simulation by up-scaling the extracted complex fracture into a 3D geological model.

FIGS. 4.1-4.2 show a method 400 for performing a microseismic fracture operation according to embodiments of the present disclosure. The method 400 involves: 0) obtaining oilfield data; 1) performing microseismic quality control, 2) describing the microseismic relationship, 3) performing ant-tracking, 4) performing fracture extraction, 5) determining fracture attributes (e.g., width), 6) performing material balance, 7) determining estimated propped fracture width, and 8) determining dynamic fracture permeability. Oilfield data may be obtained using, for example, the techniques shown in FIGS. 1.1-1.4, 2 and 3 as described herein. Items 1-8 depicted in the numbered blocks of FIGS. 4.1 and 4.2 will be discussed with respect to the numbered subheadings below:

1) Microseismic Quality Control

Before any sort of evaluation involving microseismic data is done, quality assurance and quality control (QAQC) techniques, or microseismic quality control 1, may be implemented to remove the presence of any bias inherent in the dataset, thus ensuring that the final result obtained is appropriate for further evaluation. For example, prior to any engineering interpretation, a thorough quality control evaluation of the acquisition system performance, tool orientations, and velocity model calibration may be performed. An example of a calibration that may be used is provided in Le Calvez, Using Induced Microseismicity to Monitor Hydraulic Fracture Treatment: A Tool to Improve Completion Techniques and Reservoir Management, SPE 104570, Oct. 11-13, 2006. Other conventional filtering or data quality control techniques may be used.

The evaluation of microseismic events for engineering interpretation may begin with microseismic event locations and times and associated attributes, for example, the Signal-to-Noise Ratio (SNR), error ellipsoids, compressional-to-shear wave amplitude ratios, and the event magnitude versus distance relationships. An example of interpretation of microseismic events is provided in Cipolla et al., Integrating Microseismic Mapping and Complex Fracture Modeling to Characterize Fracture Complexity, SPE 140185 presented at the SPE Hydraulic Fracturing Technology Conference, The Woodlands, Tex., 24-26 Feb. 2011.

2) Microseismic Relationship

A microseismic relationship 2 may be described to generate an output 40 of a seismic cube describing a link between each microseismic event. The microseismic relationship may be generated using a Distance method, or an Event Attribute method.

USING DISTANCE BETWEEN EVENTS—With the distance method, a three-dimensional relationship between the microseismic events as a function of the distance between the events, and the time of occurrence may be created. Examples of the distance method are described in US Patent Application No. 2010/0256964, previously incorporated by reference herein. Because the relationship is based on the relative distance between each microseismic event and the time of occurrence of each microseismic event an assumption may be made that, if two microseismic events occur relatively close to one another and at similar time periods, both microseismic events are potentially describing the same hydraulic fracture. Thus, an iterative process may be used to determine the optimum or cut-off value of the minimum distance and time of occurrence between each microseismic event to determine the connectivity between the entire microseismic events in a single stage. An outcome of this may be a 3D seismic cube describing the microseismic relationship explained above which may be used as an input to the Ant-tracking process 3.

Figure 5:
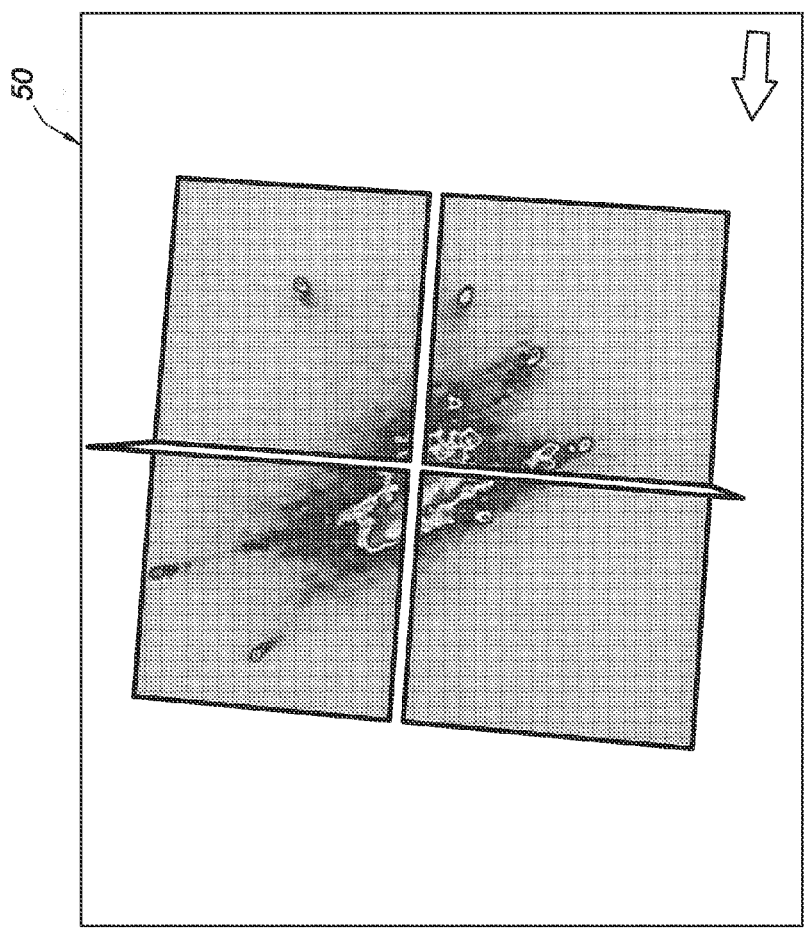
FIG. 5 illustrates a 3D seismic cube in accordance with implementations of various technologies and techniques described herein.

The seismic cube may describe a link between each of the microseismic events 40. The link or fracture volume may be based on a distance between microseismic events and the time of occurrence for each microseismic event. This may be accomplished using, for example, the techniques described in US Patent Application No. 2010/0256964. FIG. 5 shows an example of the 3D seismic cube 50 of the microseismic relationship for a single stage.

Figure 6:
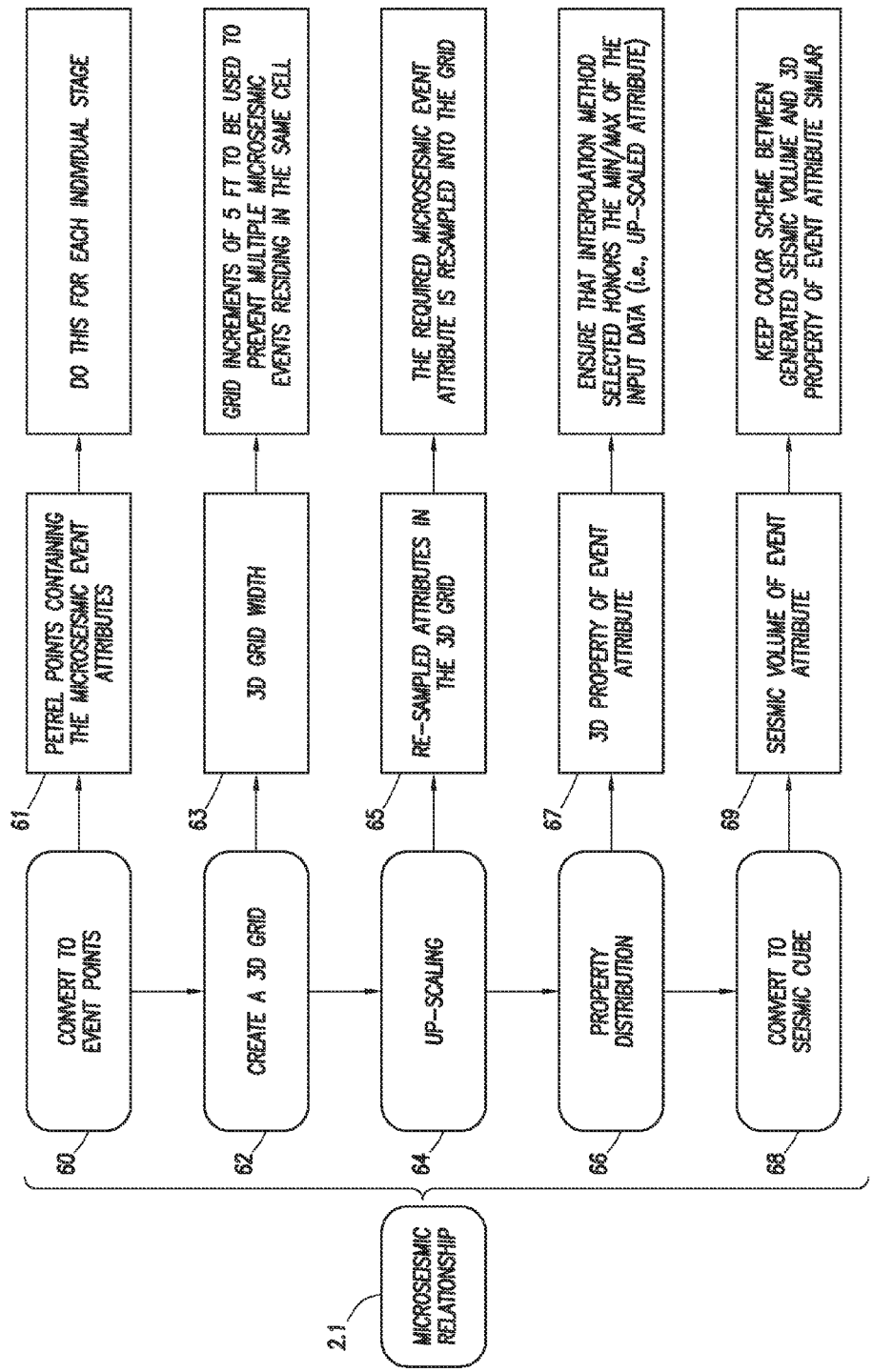
FIG. 6 illustrates a flow chart in accordance with implementations of various technologies and techniques described herein.

USING MICROSEISMIC EVENT ATTRIBUTE—An alternative method 2.1 using some of the microseismic event attributes as the base for the Ant-tracking process may also be used. The method involves performing, for example, reservoir, geological, and geophysical modeling to determine this relationship based on the microseismic event attribute, and creating a 3D seismic cube representing that relationship for a single stage. PETREL™ may be used to perform the method. This method can be applied to any of the existing microseismic event attributes (e.g. magnitude, moment, compressional-to-shear wave amplitude ratio, etc.). There are five blocks 60-68 shown in the method 2.1 illustrated in FIG. 6. The five blocks describes how the microseismic events may be converted to a desired format for use with the software used, and how a 3D distribution of the selected microseismic event attribute may be created and converted into a 3D seismic volume, which will be used for the Ant-tracking process. The process is described in greater details below:

A. Convert to event points 60: The microseismic events may be converted to a different format called event points, such as "PETREL™ Points with Attributes" usable by PETREL™, as shown in FIG. 7.1. This may involve copying over the locations of the microseismic events (i.e., X, Y, and Z) as well as the various fracture attributes, and into a new file, and saving it in a text file format. This conversion may involve the formatting of microseismic events into a readable format usable by modeling software, such as PETREL™. The output generated may be, for example, event points (e.g., PETREL points) containing the microseismic event attributes 61 for each individual stage.

B. Create a 3D grid 62: To develop a relationship between each microseismic event utilizing the attribute, a 3D structural or skeletal framework of the microseismic events may be created first. A 3D grid is a 2D grid mesh extended into the third dimension. A 2D-grid mesh is defined by rows and columns positioned in the X and Y directions (2 dimensions). A boundary is required to define the area of interest or the lateral extent (in the X, Y plane) of the microseismic events. A boundary may be defined by digitizing a polygon around the microseismic events using an imaging tool, such as the polygon tool in PETREL™. A 3D grid 63 may be generated using the digitized polygon as a boundary for the grid as shown in FIG. 7.2. In an embodiment, the grid size may be up to about 5 ft (1.52 m) by 5 ft (1.52 m) to ensure that multiple microseismic events are not located in the same cell. A 3D-grid mesh may be defined by rows, columns and pillars positioned in the X, Y, and Z directions (three dimensions). The skeletal framework may be a grid consisting of a top and base 2D grid, representing the top and bottom extent of the microseismic events.

C. Up-scaling 64: Each of the cells in the created 3D skeletal grid has to be assigned a value based on the microseismic event attributes to be used for defining the microseismic event relationship. As the grid cells may be in fact larger than the density of the microseismic events, the microseismic event attributes may be assigned into the grid cells containing the microseismic events. For each grid cell, the value of the attribute for all the microseismic events that fall within the cell may be averaged (since microseismic event measurements are discrete in nature, an average method may be used). The event (or PETREL™) points (converted from the microseismic events) may then be re-sampled or up-scaled into the generated 3D grid. The up-scaled value may then correspond to the value that is most represented by the microseismic events for that particular cell. This may be done for each of the microseismic event attributes. The results 65 may be re-sampled and up-scaled microseismic event attributes in a 3D grid stored under the property icon of the 3D grid in the model pane as shown in FIG. 7.3. At the end of this process, some grid cells may have undefined values depending on whether the cells initially contained any microseismic events or not.

D. Property Distribution 66: Microseismic events are discrete measurements i.e. measurement at a particular location (X, Y, and Z) in the formation. To determine a 3D relationship between each microseismic event, the discrete data may be converted into a 3D continuum grid. This may be achieved by a property distribution process. Property distribution is the process of filling the cells of the 3D skeletal grid with discrete properties representing the microseismic event attributes. Using a suitable interpolation algorithm, each of the up-scaled event attributes 65 may be distributed (or propagated) to the entire 3D grid 63 as shown in FIG. 7.4. In an example embodiment, the minimum and maximum of interpolation algorithm may honor the input data used. The final results 67 of this process may be a 3D property of an event attribute. The interpolation method may be selected that honors the min/max of the input data (e.g., up-scaled event attribute). At the end of this process, all the grid cells may have a value representative of the microseismic event attribute.

E. Convert to seismic cube 68: The Ant-tracking process may require the input 3D volume to be in a 3D seismic cube format (e.g. SEG-Y or ZGY formats). Thus, the 3D grid containing the continuous microseismic event attributes may be converted into the seismic cube format. The interpolated 3D event attribute volume may be converted into a seismic cube volume 69 as shown in FIG. 7.5. This may be performed, for example, via the operations tab in the property settings in PETREL™. Once the seismic cube or volume 69 is generated, the default template may be changed to what was used to define the event attribute initially. For consistency, a color scheme between the generated seismic volume and a 3D property of an event attribute may be made similar.

FIGS. 7.1-7.5 show the method and results of converting the microseismic event magnitude to a seismic volume. As stated earlier, a similar process can be applied to any of the other microseismic event attribute.

3) Ant-Tracking

Referring back to FIGS. 4.1 and 4.2, Ant-tracking 3 using the techniques described herein, may be performed to generate an ant-track cube volume and enhance trends within the seismic cube 44. Ant-tracking settings may be adjusted to obtain high resolution features in the seismic cube, and a stereonet filter may be used based on known stress directions. An Ant-tracking algorithm may be used to automatically extract faults, fractures, or other geological features from a pre-processed seismic volume. This may be achieved by emulating the behavior of ant colonies in nature and how they use foramens to mark their paths in order to optimize the search for food. Similarly, "artificial ants" are put as seeds on a seismic discontinuity volume to look for fault zones. Virtual pheromones deployed by the ants capture information related to the fault zones in the volume. The result is an attribute volume that shows fault zones sharp and detailed. The same concept may be applied to the microseismic event cloud, but the pre-processed seismic volume here is replaced with the 3D seismic cube describing the microseismic relationship. In this case, the aim of the "artificial ants" is to determine and highlight the dominant or subtle features contained within the 3D seismic cube describing the microseismic relationship. Once these features have been identified, it will reflect the possible location and distribution of the created complex fracture trends from the hydraulic fracture treatment.

In an example embodiment, Ant-tracking may be run on a realized (process of creating a physical copy of any seismic volume or 2D line) seismic volume, so that after the 3D microseismic volume is imported into PETREL™, a realized volume may be made. According to an example embodiment, there are six Ant-tracking 'parameter settings', descriptions and optimum values for the Ant-tracking process, namely the initial ant boundary (defines the initial distribution of agents throughout the volume and controls the level of detail revealed by the ants; optimum value may be 2); the ant tract deviation (controls how much the ants can deviate from the initial; optimum value may be 2); ant step size (determines how far an ant can search to find a connection; optimum value may be 2); illegal steps allowed (defines how many steps an ant agent can go without finding any connection; optimum value may be 1); legal steps (defines the number of steps for a valid connection; optimum value may be 2); stop criteria % (used to terminate an ant's advance when too many illegal steps have been taken; optimum value may be 10). These parameters may be adjusted to find the optimal connectivity for the fracture features within the 3D microseismic volume.

Once the optimum parameter setting is established, this may be kept fairly constant for all the stages on the well to ensure consistency in the final results. FIGS. 8.1-8.2 present examples of the Ant-tracking results for two different stages of a wellbore, 80, 84, respectively. The perceived fracture trends may be identified by highlighted streaks within the Ant-track volume.

Figure 9:
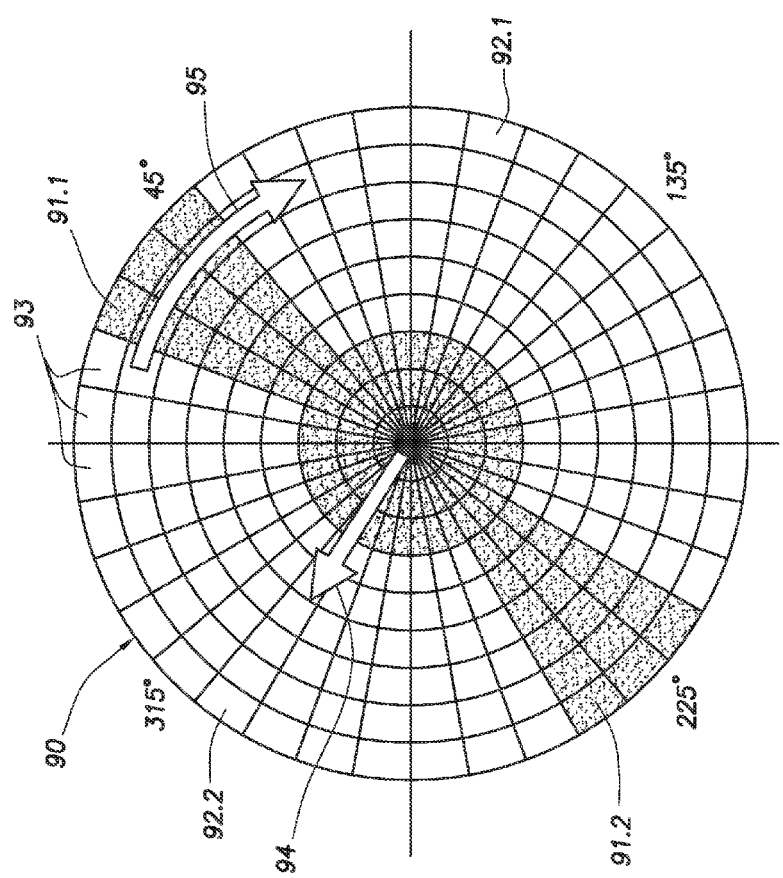
FIG. 9 illustrates an orientation filter in accordance with implementations of various technologies and techniques described herein.

Certain shale-gas reservoirs may have multiple natural fracture sets, which may be in orthogonal directions. It may be expected that the created complex fracture network resulting from the stimulation treatment may be parallel to these natural fractures. To ensure this is captured during the Ant-tracking process, an orientation or stereonet filter 90 (see FIG. 9), such as one in PETREL™, may be used. The orientation filter 90 is a 360 degree grid which controls which "sectors" the ant agents are allowed to search for a connection. As shown in FIG. 9, sectors 91.1 and 91.2 are sectors that the ant will reject and sectors 92.1 and 92.2 are sectors that the ant will accept. The sectors 93 are portions defined at various dips 94 along the azimuth 95.

The Ant-tracking results using the orientation filter may be compared to the results without the filter to ensure that the ant agents are not extracting features that do not exist.

4) Fracture Extraction

Referring back to FIG. 4.1, the Ant-track volume contains the location and distribution of the complex fracture trends. To describe the created complex fractures, these trends may be represented by planes. This may be done either manually or automatically. The trends may be extracted within the Ant-track volume describing the complex fractures. PETREL™ may be used to perform automatic fracture extraction and interpretation from a seismic volume.

Fracture extraction 4 may be used to extract a discrete fracture network (DFN) 46. For each stage, an automatic fault patch extraction using consistent settings may be used to extract planes representing the trends identified from the Ant-tracking process, and then convert to a DFN. The automatic fault extraction process (using, e.g., PETREL™) provides a set of interactive tools to extract, display, analyze, and edit fault patches. Fault patches may be extracted from an Ant Track volume. Similar to the Ant-tracking process, there are six parameters involved in the automatic fault extraction process (see 'parameter settings' above). Several trials may be carried out by varying these parameters until the majority of the features in the Ant Track volume (see FIG. 8) are captured.

Figure 10:
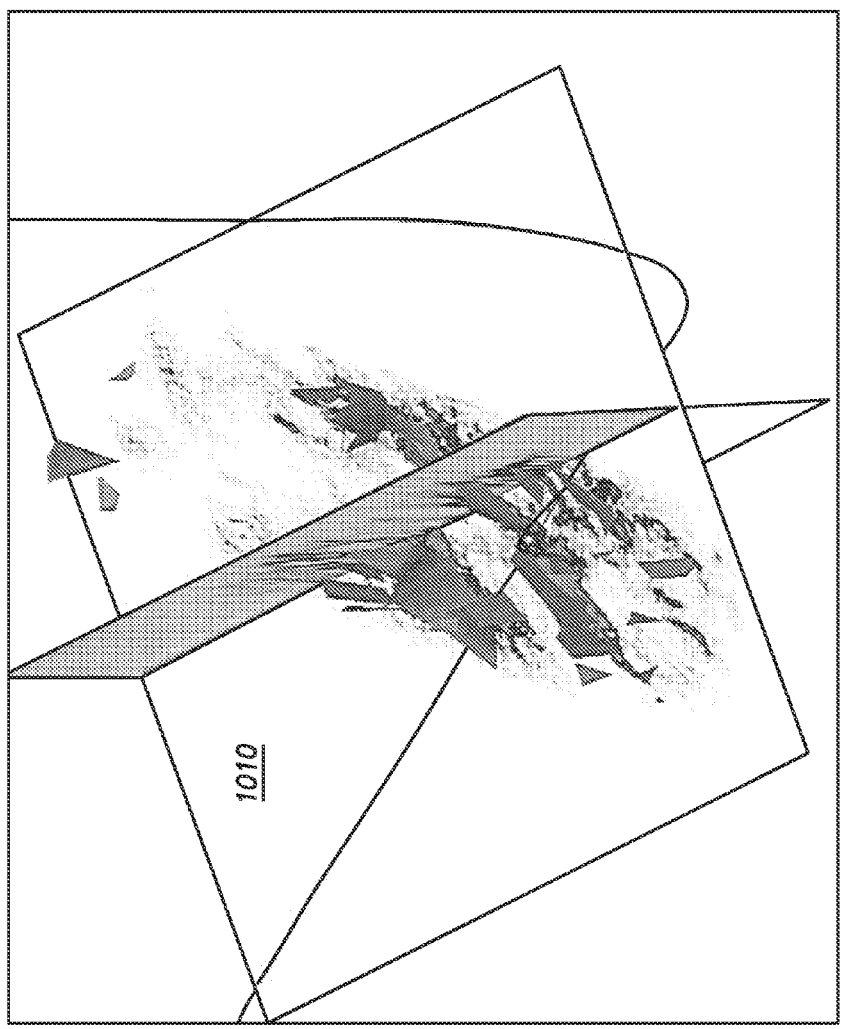
FIG. 10 illustrates screenshot results in accordance with implementations of various technologies and techniques described herein.

Once the optimum parameter setting is established, this may be kept fairly constant for the stages on the well to ensure consistency in the final results. The extracted fault patches may be stored in a folder under the input pane in PETREL™. FIG. 10 shows the extracted fault patch 1010 for a single stage along with the corresponding Ant Track volume.

Figure 11:
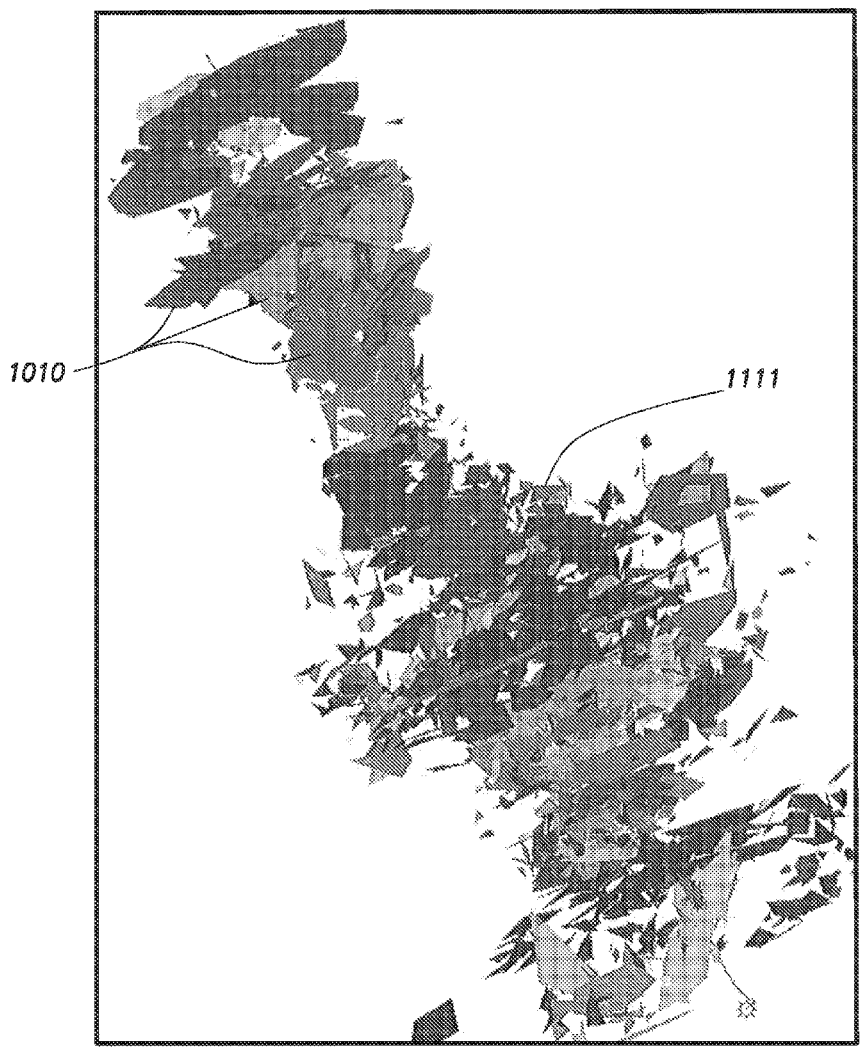
FIG. 11 illustrates screenshot results in accordance with implementations of various technologies and techniques described herein.

The extracted fault patches 1010 may be converted to a discrete fracture network (DFN) 1111 using fracture modeling, such as the fracture modeling process provided in PETREL™ as shown in FIG. 11. The fault patches may be used as the input to generate the resulting DFN. FIG. 11 shows example results for the stages. Each individual fracture in the created DFN may have the following fracture attributes automatically computed: azimuth, dip, surface area, and fracture length. For complete modeling purposes, the fracture width (aperture) and permeability may be explicitly defined or estimated.

5) Fracture Width

Fracture width processes 5 may be performed to estimate fracture attributes, such as the hydraulic fracture width 48. To estimate the fracture width, the geomechanical properties of the formation may be incorporated. The geomechanical properties may include minimum horizontal stress 1212, Young's modulus 1214, and Poisson's ratio 1216 as schematically depicted in FIGS. 12.1-12.3, respectively. First a 3D 1310 grid may be created around the subject well to which the created DFN 1111 belongs, and these geomechanical properties may be populated throughout the 3D grid. FIGS. 12.1-12.3 shows example 3D grids 1210, 1214 and 126 with the populated geomechanical properties based on horizontal stress, Young's modulus and Poisson's ratio, respectively. The defined 3D grid may encompass the DFN 1111 created previously.

The individual average fracture width for each fracture may be estimated using the Khristianovich, Zheltov, Geertsma, de Klerk (KGD) width model:

$$(W_f)_i = (1 - v^2)(x_f)_i \frac{\Delta P}{E} \quad (1)$$

Where $W_f$ is the fracture width; V2 is the Poisson's ratio, $x_f$ is the fracture half-length; $\Delta P$ is the net pressure; and E is the Young's Modulus.

The fracture half-length used in the equation above may be taken directly from the created DFN attribute; Poisson's ratio and Young's modulus are taken directly from the populated 3D grid (see FIG. 11), while the net pressure is calculated from the difference between the closure pressure at the end of the stimulation treatment and the minimum horizontal stress (from the 3D grid).

6) Material Balance

Referring again back to FIG. 4.1, the material balance process 6 may be used to compare the fracture volume to the injected volume 49. Fluid efficiency may be applied based on formation properties and fluid type to calibrate the fracture volume. The extracted fracture network satisfies the principle of conservation of mass. In other words, the total slurry volume pumped should be equal to the total fracture network volume plus the volume leaked off into the formation. Thus, assuming a fluid efficiency, the total fracture network volume for a given stage is given by:

$$V_{frac} = \Sigma_{i=1}^{N}(A_f * W_f) = \eta * V_{slurry} \quad (2)$$

where N represents the total number of fractures in that stage; $A_f$ represents fracture surface area; $\eta$ represents the fluid efficiency; $V_{frac}$ represents the fracture volume; and $V_{slurry}$ represents the injected volume. The fluid efficiency is selected based on the geological information of the reservoir and the type of stimulation fluid used.

7) Propped Fracture Width

The propped fracture width process 7 may be used to estimate the propped fracture width 45. The propped fracture width represents the width of the fracture after the injected fluid has either been produced or lost into the formation, and the formation compresses against the created fracture. For this process, it may be assumed that the proppant distribution is uniform and that all fluid is lost into the formation upon closure. The fracture width calculated in Eq. 1 may be used to represent the hydraulic width at the end of pumping. This may not be representative of the actual width during the production phase of the well. The hydraulic width may be modified to account for proppant distribution or other holding-open mechanism and possible full closure of fracture segments during production. This may depend on many complex mechanisms difficult to explicitly define. For the propped fracture width process 7, two assumptions may be made to simplify the problem. First, upon fracture closure, the fluid within the fracture network may be assumed to dissipate into the formation. Second, the total proppant pumped may be assumed to be uniformly distributed within the fractures. With these assumptions, this implies that the total volume of the extracted fracture network should be equivalent to the volume of proppant pumped during that stage, i.e.:

$$V_{frac} = V_{proppant} \quad (3)$$

The total mass of proppant contained within an individual member of the fracture network is estimated by multiplying Eq. 3 above by average proppant concentration pumped:

$$M_{proppant} = V_{proppant} * C_{proppant} \quad (4)$$

where $M_{proppant}$ represents propped mass; and $C_{proppant}$ represents concentration. The average propped fracture width for each individual fracture is given by:

$$(w_p)_i = \frac{1}{(1 - \varphi_{proppant}) * \rho_{proppant}} \left(\frac{M_{proppant}}{A_f}\right)_i \quad (5)$$

$$(w_p)_i \geq (w_p)_{min}$$

where $w_p$ represents the propped width; $\phi_{proppant}$ represents porosity of the proppant pack, and $\rho_{proppant}$ represents the density of the proppant.

Figure 13:
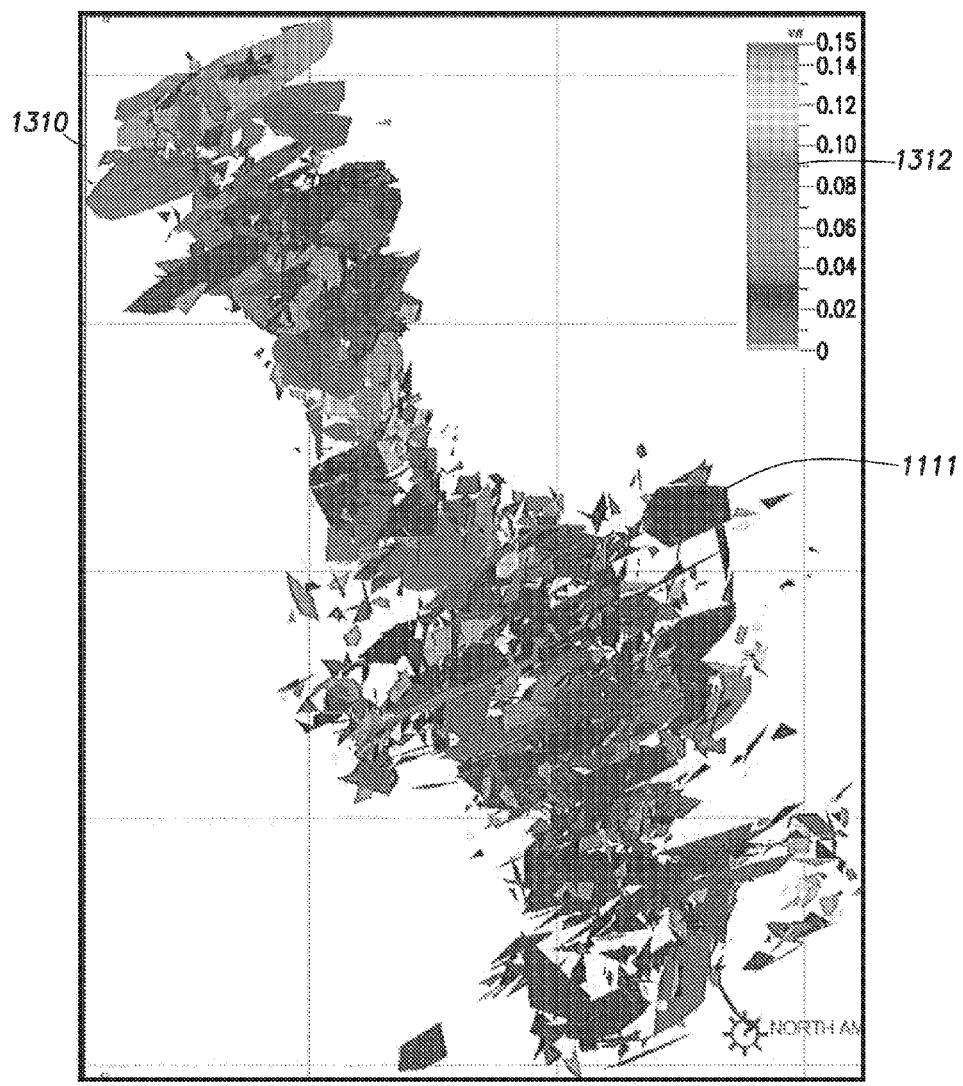
FIG. 13 illustrates screenshot results in accordance with implementations of various technologies and techniques described herein.

The mean diameter of the proppant pumped during the job may be used to set the minimum propped fracture width. At the end of the exercise, any fracture with a calculated propped width less than the specified minimum may be set to zero, since it is physically impossible for those fractures to contain any proppant. The proppant mass initially calculated within those fractures may be distributed to the other fractures, resulting in a sort of iterative process. At the end of this, some of the extracted fractures may have a value for the propped width, while others may have a value of zero as shown. FIG. 13 shows a grid 1310 with the DFN 1111 and with the results of the fractures shaded (which may be in color coding) by the propped width according to the legend 1312.

8) Dynamic Fracture Permeability

The dynamic fracture permeability process 8 may be used to generate a propped width permeability function 47. The well flowing condition and concentration of the slurry volume pumped may be used to obtain dynamic permeability of a proppant pack. The reported conductivity or permeability for different proppant types may not be representative of the dynamic condition of the fracture during the production of a well. It might not take into account the effects of relative permeability, non-Darcy flow, fluid retained permeability, filter cake width, and the flowing rate condition (rates and drawdown).

Wellsite modeling software capable of determining, for example, long-term conductivity of proppant under actual flowing conditions, impact of fracturing fluid leak-off and damage upon proppant conductivity, impact of non-Darcy and multiphase flow on effective conductivity may be used in performing the modeling. The software may be, for example, PREDICTK™ software, a technology commercially available from CORE LABS™, (referred to herein as "PREDICTK™"). Thus, a user may use PREDICTK™ software to estimate the dynamic permeability of the calibrated fracture network. One of the input parameters may include the concentration of the proppant within the fracture, which may be calculated using Eq. 6 below.

$$(C_{proppant})_i = \sum_{i=1}^{N} \left[\frac{(M_{proppant})}{(A_f)}\right]_i \left(\frac{lb}{ft^2}\right) \quad (6)$$

Figure 14:
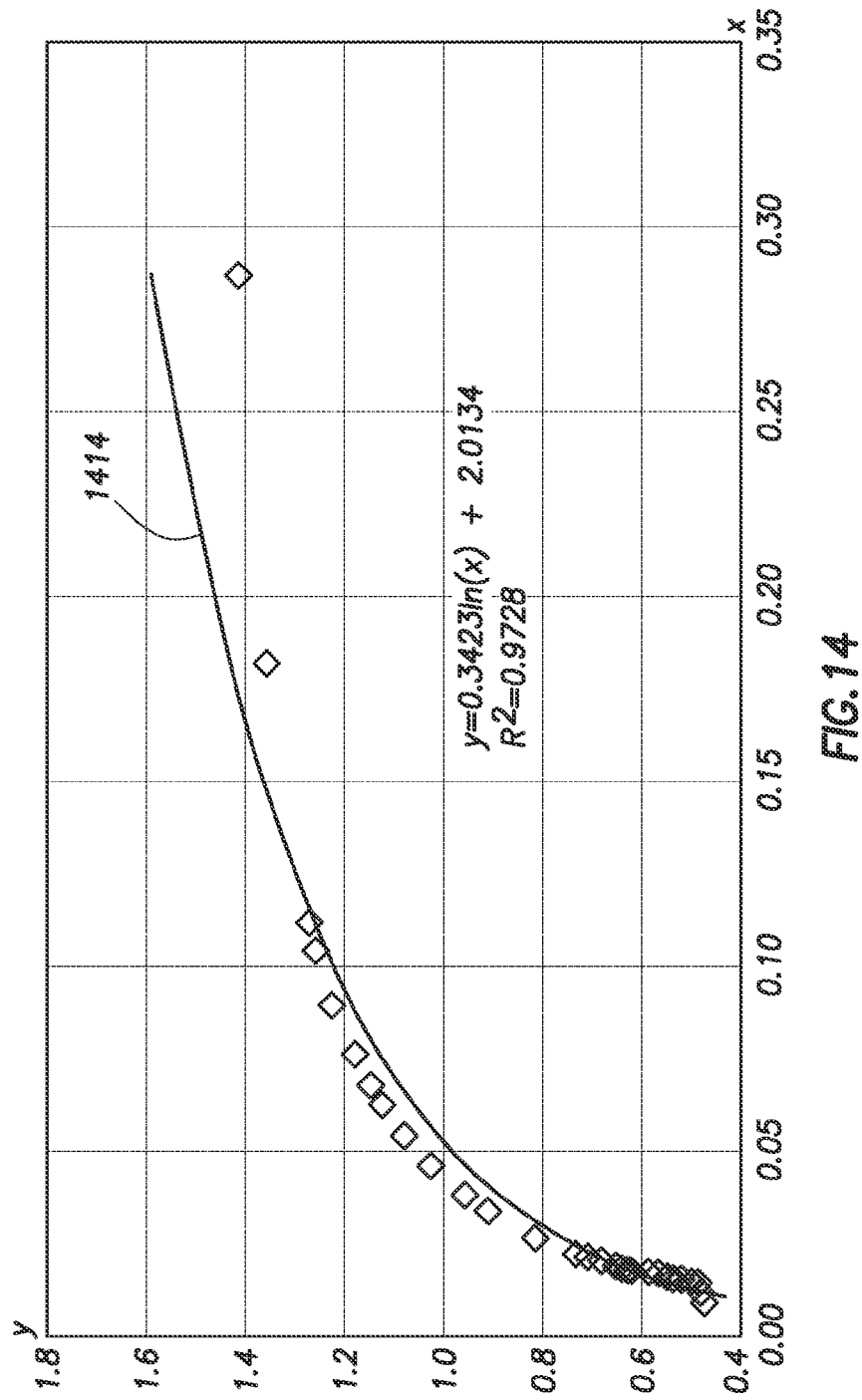
FIG. 14 illustrates a table in accordance with implementations of various technologies and techniques described herein.

This results in an array of proppant concentration and, when run through PREDICTK™, generates a resulting array of dynamic permeability. And since the proppant concentration is related to the propped width (Eq. 5), the resulting dynamic permeability (y-axis) array may be plotted against the propped width (x-axis) as shown in FIG. 14. The results provide a permeability model 1414. In a given example, the permeability model 1414 may be described according to the following:

$$y=0.3423 \ln(x)+2.0134$$

$$R^2=0.9728 \quad (7)$$

A correlation may be obtained between the fracture propped width and the dynamic permeability. The derived correlation may then be used to assign dynamic permeability values to the entire fracture network.

If desired, the fracture attributes may be fed into a production simulator, such as PETREL™, to perform dynamic modeling and determine an estimated production rate. The fracture attributes may be adjusted prior to use with the production simulator.

9) Simulating Fracture Geometry and Proppant Placement

As an alternative to steps 5) to 8), and a calibration of fracture attributes, an unconventional fracture model (UFM) may be used to simulate complex hydraulic fracture growth and proppant transport using the DFN extracted from microseismic data using Ant-tracking as an input into UFM. The UFM model simulates the fluid flow and proppant transport in the extracted fracture network, and provides a special distribution of parameters, such as propped width, proppant distribution, and fracture permeability, inside the fracture network. The computed parameters from the UFM simulator may automatically satisfy geomechanical conditions, material balance and fracture permeability relations as described in steps 5) to 8) everywhere in the complex fracture network rather than in the average sense. This information may then be passed to a production simulator, such as PETREL™, to simulate the production.

The Ant Tracking parameters may be calibrated so that the hydraulically opened fracture network computed from UFM approximately agrees with the Ant Tracking extracted DFN. If UFM shows fluid penetrates only a small part of the extracted DFN, then the DFN may be too large and fail to be satisfied by the material balance. Conversely, if UFM shows fracture propagates well beyond the Ant Tracking extracted DFN, then the extracted DFN may be too small. The Ant Tracking parameters may be adjusted so the extracted DFN is consistent with the model predicted network dimensions. Once calibrated, the parameters may be used for fracture extraction in subsequent treatments.

The UFM simulation may also involve optimization of treating parameters, such as pump rate, fluid viscosity, fluid volume, proppant sizes, amount of different proppants, number of perforations and perforation clusters, and perforation cluster spacing, etc. to maximize the production of the subsequent stages in the well or in the adjacent wells.

Figure 17:
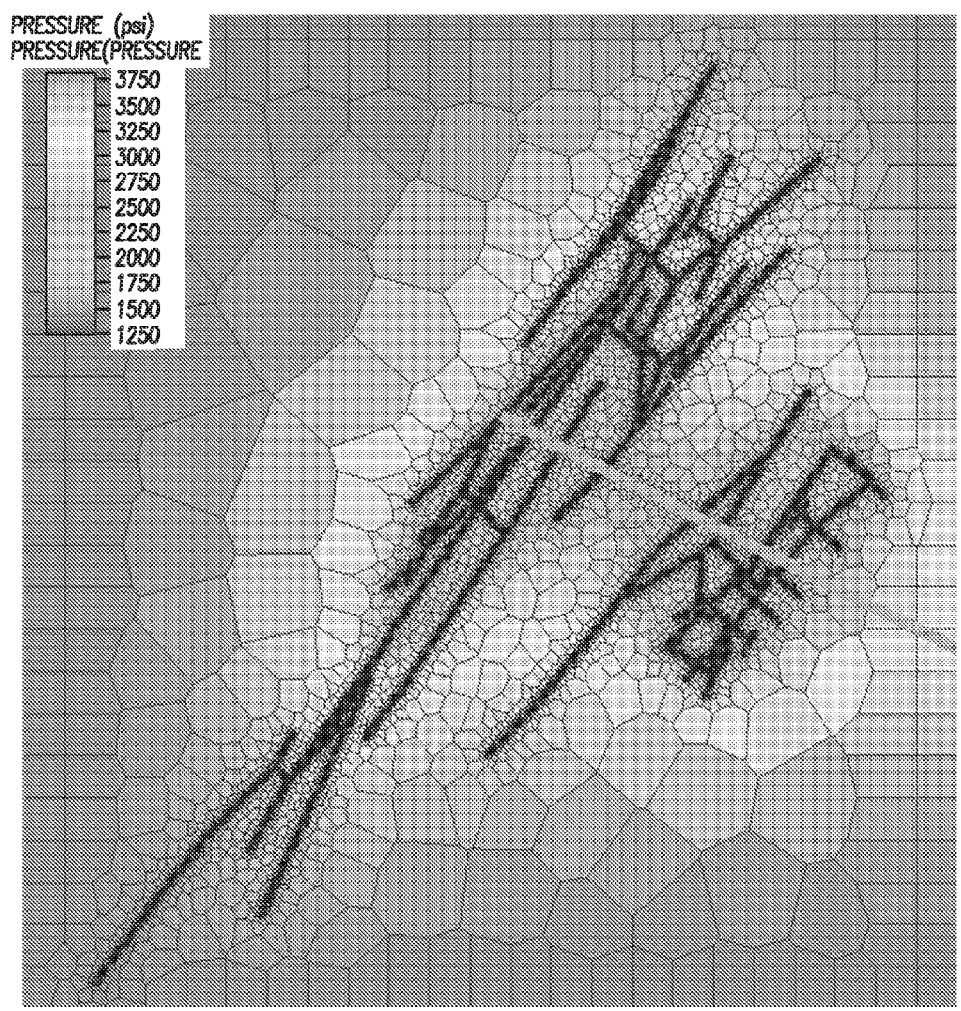
FIG. 17 illustrates a production simulation.
Figure 18:
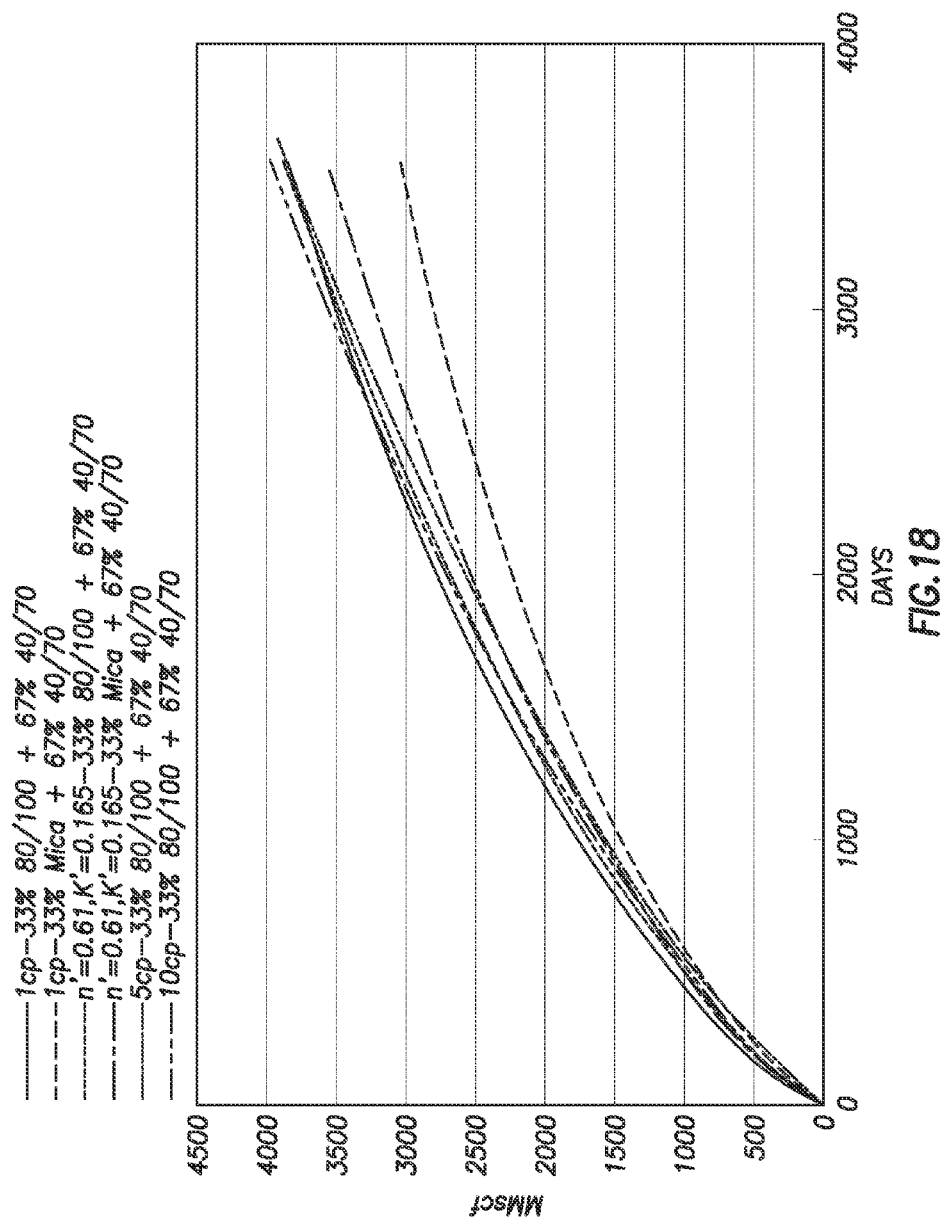
FIG. 18 is a graph illustrating simulated production for various treatment designs.

FIGS. 16.1 and 16.2 are schematic illustrations of proppant distribution 160 and fracture width, 161 respectively. FIG. 17 depicts an example of a production simulation using PETREL™. FIG. 18 is a graph depicting simulated production for various treatment designs. The graph illustrates gas flow in MMscf (y-axis) versus time in days (x-axis) for the various treatments. These figures depict examples using UFM as described.

Computer System for Oilfield Application System

Figure 15:
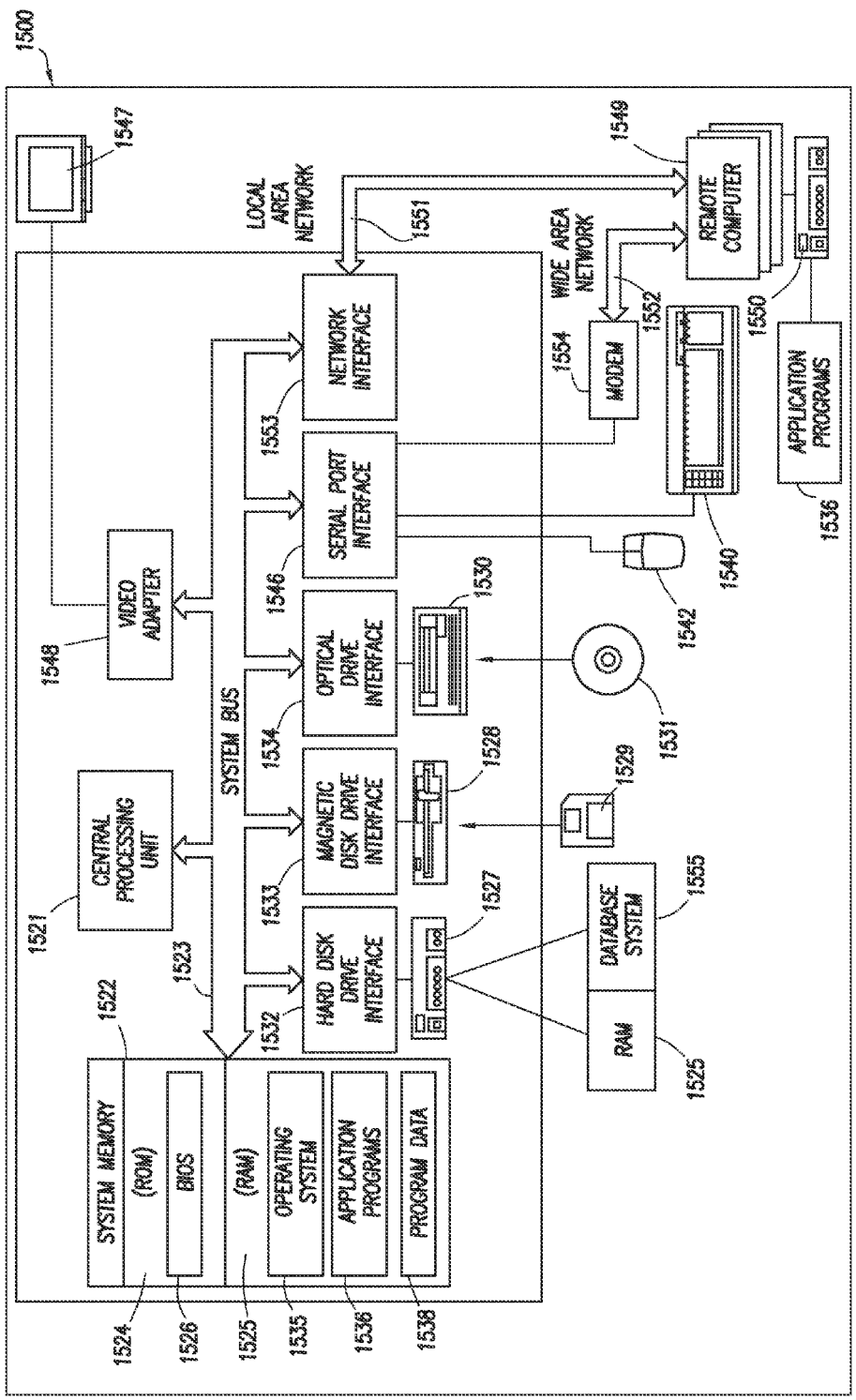
FIG. 15 schematically illustrates a computer system in accordance with implementations of various technologies and techniques described herein.

FIG. 15 illustrates a computer system 1500 into which implementations of various technologies and techniques described herein may be implemented. The computer system 1500 may form part of the systems of FIGS. 1.1-1.4, such as the computer 122.1 and/or surface unit 134. The computer system 1500 may work with the microseismic fracture operation system 150 to perform the functions of the tools thereof, and to perform the methods as described, for example in FIG. 4. One or more computer systems 1500 may be provided on or offsite the oilfield 100.

In one implementation, computing system 1500 may be a conventional desktop or a server computer, but it should be noted that other computer system configurations may be used. The computing system 1500 may include a central processing unit (CPU) 1521, a system memory 1522 and a system bus 1523 that couples various system components including the system memory 1522 to the CPU 1521. Although only one CPU is illustrated in FIG. 15, it should be understood that in some implementations the computing system 1500 may include more than one CPU. The system bus 1523 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral A Peripheral Component Interconnect (PCI) bus may also be known as Mezzanine bus. The system memory 1522 may include a read only memory (ROM) 1524 and a random access memory (RAM) 1525. A basic input/output system (BIOS) 1526, containing the basic routines that help transfer information between elements within the computing system 1500, such as during start-up, may be stored in the ROM 1524.

The computing system 1500 may further include a hard disk drive 1527 for reading from and writing to a hard disk, a magnetic disk drive 1528 for reading from and writing to a removable magnetic disk 1529, and an optical disk drive 1530 for reading from and writing to a removable optical disk 1531, such as a CD ROM or other optical media. The hard disk drive 1527, the magnetic disk drive 1528, and the optical disk drive 1530 may be connected to the system bus 1523 by a hard disk drive interface 1532, a magnetic disk drive interface 1533, and an optical drive interface 1534, respectively. The drives and their associated computer-readable media may provide nonvolatile storage of computer-readable instructions, data structures, program modules and other data for the computing system 1500.

Although the computing system 1500 is described herein as having a hard disk, a removable magnetic disk 1529 and a removable optical disk 1531, it should be appreciated by those skilled in the art that the computing system 1500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1500. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 1527, magnetic disk 1529, optical disk 1531, ROM 1524 or RAM 1525, including an operating system 1535, one or more application programs 1536, program data 1538, and a database system 1555. The operating system 1535 may be any suitable operating system that may control the operation of a networked personal or server computer, such as Windows® XP, Mac OS® X, Unix-variants (e.g., Linux® and BSD®), and the like. In one implementation, plug-in manager 420, oilfield application 415, the plug-in quality application and the plug-in distribution application described in FIGS. 4-9 in the paragraphs above may be stored as application programs 1536 in FIG. 15.

A user may enter commands and information into the computing system 1500 through input devices such as a keyboard 1540 and pointing device 1542. Other input devices may include a microphone, joystick, game pad, satellite dish, scanner, or the like. These and other input devices may be connected to the CPU 1521 through a serial port interface 1546 coupled to system bus 1523, but may be connected by other interfaces, such as a parallel port, game port or a universal serial bus (USB). A monitor 1547 or other type of display device may also be connected to system bus 1523 via an interface, such as a video adapter 1548. In addition to the monitor 1547, the computing system 1500 may further include other peripheral output devices such as speakers and printers.

Further, the computing system 1500 may operate in a networked environment using logical connections to one or more remote computers 1549. The logical connections may be any connection that is commonplace in offices, enterprise wide computer networks, intranets, and the Internet, such as local area network (LAN) 1551 and a wide area network (WAN) 1552. The remote computers 1549 may each include application programs 1536 similar to that as described above. In one implementation, the plug-in quality application (i.e., performing method 500) stored in plug-in quality center 460 may be stored as application programs 1536 in system memory 1522. Similarly, the plug-in distribution application (i.e., performing method 600) stored in plug-in distribution center 470 may be stored as application programs 1536 in remote computers 1549.

When using a LAN networking environment, the computing system 1500 may be connected to the local network 1551 through a network interface or adapter 1553. When used in a WAN networking environment, the computing system 1500 may include a modem 1554, wireless router or other means for establishing communication over a wide area network 1552, such as the Internet. The modem 1554, which may be internal or external, may be connected to the system bus 1523 via the serial port interface 1546. In a networked environment, program modules depicted relative to the computing system 1500, or portions thereof, may be stored in a remote memory storage device 1550. It will be appreciated that the network connections shown are example and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims may not be limited to the specific features or acts described above. Rather, the specific features and acts described above are disclosed as example forms of implementing the claims.

Although only a few example embodiments have been described in detail above, those skilled in the art will readily appreciate that many modifications are possible in the example embodiments without materially departing from this invention. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of performing a microseismic fracture operation for a wellsite having a subterranean formation with a complex fracture network therein, comprising:
   performing the microseismic fracture operation with a fracture unit;
   obtaining oilfield data from the microseismic fracture operation, the oilfield data comprising a plurality of microseismic events;
   describing a relationship between microseismic events of the complex fracture network of the subterranean formation;
   generating a fault volume by extracting faults from the fracture network based on the relationship between the microseismic events;
   generating a discrete fracture network comprising discrete fractures from the complex fracture network by extracting fracture planes from the obtained fault volume;
   determining fracture attributes of the discrete fractures of the fracture planes; and
   determining fracture permeability from a correlation between dynamic wellsite parameters and the fracture attributes.

2. The method of claim 1, further comprising performing microseismic quality control on the obtained oilfield data.

3. The method of claim 1, wherein the describing is based on a function of a distance between events and a time of occurrence.

4. The method of claim 1, wherein the describing is based on microseismic event attributes.

5. The method of claim 4, wherein the describing comprises converting microseismic points, creating a three-dimensional grid with the converted microseismic points, upscaling the fracture attributes by resampling the microseismic event attributes in the three-dimensional grid, distributing properties of the microseismic event attributes, and converting a seismic volume to a seismic cube.

6. The method of claim 1, wherein the generating a fault volume comprises performing Ant-tracking.

7. The method of claim 6, wherein the Ant-tracking is performed using parameter settings comprising an initial ant boundary, an ant tract deviation, an ant step size, illegal steps allowed, legal steps, and stop criteria percentage.

8. The method of claim 6, further comprising filtering the generated fault volume using an orientation filter.

9. The method of claim 1, wherein the determining fracture attributes comprises generating a three dimensional grid around a well of the discrete fracture network and populating geomechanical properties throughout the grid based on horizontal stress, Young's modulus and Poisson's ratio.

10. The method of claim 1, wherein the fracture attributes comprise fracture volume and injected volume, the method further comprising comparing the fracture volume to the injected volume.

11. The method of claim 1, wherein the determining the fracture attributes comprises estimating propped fracture width based on a porosity of the proppant and a density of the proppant.

12. The method of claim 11, wherein the determining the fracture permeability is performed based on a correlation between the propped fracture width and a dynamic permeability.

13. The method of claim 1, wherein the determining fracture attributes comprises performing unconventional fracture modeling using the extracted discrete fracture network and Ant-tracking.

14. The method of claim 13, wherein the fracture permeability is determined from a correlation between dynamic wellbore parameters and fracture attributes.

15. The method of claim 1, further comprising simulating production based on the fracture attributes.

16. The method of claim 1, further comprising adjusting the fracture attributes based on the simulated production.

17. The method of claim 16, wherein the adjusting comprises one of globally adjusting, adjusting by an empirical factor, history matching and combinations thereof.

18. The method of claim 1, wherein the fracture attributes are selected from the group of fracture width, porosity and permeability.

19. The method of claim 18, wherein the determining fracture attributes comprises calibrating the discrete fracture network based on formation and stimulation parameters.

20. A method of performing a microseismic fracture operation for a wellsite having a subterranean formation with a fracture network therein, comprising:
   performing the microseismic fracture operation with a fracture unit to generate a plurality of microseismic events in the subterranean formation;
   describing a relationship between microseismic events of the complex fracture network of the subterranean formation;
   generating a fault volume by extracting faults from the fracture network based on the relationship between the microseismic events;
   generating a discrete fracture network comprising discrete fractures from the complex fracture network by extracting fracture planes from the obtained fault volume;
   determining fracture attributes of the discrete fractures of the fracture planes;
   determining permeability from a correlation between dynamic wellsite parameters and the fracture attributes; and
   determining an estimated production rate based on the fracture attributes.

21. The method of claim 20, wherein the determining an estimated production rate is performed using dynamic modeling.

22. The method of claim 21, further comprising adjusting the fracture attributes based on dynamic modeling.

23. The method of claim 20, further comprising adjusting the estimated production rate based on actual production.

24. The method of claim 20, further comprising designing a well plan based on the estimated production rate.

25. The method of claim 20, further comprising implementing a well plan at the wellsite.

26. The method of claim 25, wherein the implementing comprises drilling a wellbore, completing the wellbore and producing fluids from the wellbore.

27. A system for performing a microseismic fracture operation for a wellsite having a subterranean formation with a fracture network therein, comprising:
- a fracture unit, comprising:
  - a microseismic tool that generates fault volumes by describing a relationship between microseismic events of the fracture network and extracting faults in the fracture network based on the relationship between the microseismic events;
  - a fracture tool that generates discrete fractures from the fracture network by extracting fracture planes from the obtained fault volumes and determines fracture attributes of the discrete fractures of the fracture planes;
  - a wellsite tool that simulates fracture geometry and proppant placement; and
  - an optimizer that adjusts the fracture attributes based on dynamic modeling.

28. The system of claim 27, further comprising at least one oilfield tool positionable about the wellsite, the at least one oilfield tool that collects data from the sensors at the wellsite.

29. The system of claim 27, wherein the at least one oilfield tool comprises at least one of a seismic truck, a wireline tool, a drilling tool, a perforating tool, an injection tool, and combinations thereof.

30. The system of claim 27, further comprising a surface unit operatively connectable to the fracture unit and the wellsite tool.

31. The system of claim 27, wherein the wellsite tool determines permeability from a correlation between dynamic wellbore parameters and the fracture attributes.

* * * * *